(12) United States Patent
Tabuchi

(10) Patent No.: US 12,308,721 B2
(45) Date of Patent: May 20, 2025

(54) ROTATING ELECTRICAL MACHINE

(71) Applicant: DENSO CORPORATION, Kariya (JP)

(72) Inventor: Toru Tabuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 240 days.

(21) Appl. No.: 17/983,460

(22) Filed: Nov. 9, 2022

(65) Prior Publication Data

US 2023/0064806 A1    Mar. 2, 2023

Related U.S. Application Data

(63) Continuation of application No. PCT/JP2021/025833, filed on Jul. 8, 2021.

(30) Foreign Application Priority Data

Jul. 14, 2020  (JP) .................................. 2020-120729

(51) Int. Cl.
   *H02K 3/52*   (2006.01)
   *H02K 11/21*  (2016.01)

(52) U.S. Cl.
   CPC ............. *H02K 3/522* (2013.01); *H02K 11/21* (2016.01); *H02K 2211/03* (2013.01)

(58) Field of Classification Search
   CPC .......... H02K 11/21; H02K 11/33; H02K 3/34; H02K 3/52; H02K 3/522; H02K 5/04; H02K 5/08; H02K 5/10; H02K 5/225; H02K 29/08; H02K 29/12
   See application file for complete search history.

(56) References Cited

U.S. PATENT DOCUMENTS

| | | | | |
|---|---|---|---|---|
| 5,073,735 | A | * 12/1991 | Takagi | ................... H02K 37/18 |
| | | | | 310/43 |
| 2001/0002776 | A1* | 6/2001 | Suzuki | ................... H02K 21/48 |
| | | | | 310/194 |
| 2004/0007935 | A1* | 1/2004 | Kimura | ................... H02K 3/522 |
| | | | | 310/71 |

(Continued)

FOREIGN PATENT DOCUMENTS

| | | |
|---|---|---|
| EP | 3 644 478 | 4/2020 |
| JP | 2010154701 A | 7/2010 |

(Continued)

*Primary Examiner* — Tran N Nguyen
(74) *Attorney, Agent, or Firm* — Nixon & Vanderhye P.C.

(57) ABSTRACT

A rotating electrical machine includes a plurality of winding holding portions, a plurality of coil terminals having a winding connection portion connected to a winding, and a plurality of motor terminals connected to the coil terminal. The winding has two or more coils between one end portion and the other end portion. The winding holding portion and the winding connection portion are arranged inward of the coil in the radial direction. The motor terminal includes a connector portion connectable to an external power supply terminal, a contacted portion contacted by the contact portion of the coil terminal in the axial direction, and a connecting portion that connects the connector portion and the contacted portion. At least a portion of the connecting portion extends from the connector portion to the contacted portion through an opposite side to the stator core with respect to a metal plate.

6 Claims, 21 Drawing Sheets

(56) References Cited

U.S. PATENT DOCUMENTS

| | | | |
|---|---|---|---|
| 2007/0205679 A1* | 9/2007 | Terauchi | H02K 3/522 |
| | | | 310/43 |
| 2009/0127943 A1 | 5/2009 | Machida et al. | |
| 2013/0234548 A1 | 9/2013 | Oishi | |
| 2019/0044406 A1 | 2/2019 | Yamamoto | |

FOREIGN PATENT DOCUMENTS

| | | |
|---|---|---|
| JP | 2020-36512 | 3/2020 |
| WO | 2013/065577 | 5/2013 |

* cited by examiner

ROTATING ELECTRICAL MACHINE

CROSS REFERENCE TO RELATED APPLICATIONS

This application is a continuation application of International Patent Application No. PCT/JP2021/025833 filed on Jul. 8, 2021, which designated the U.S. and based on and claims the benefits of priority of Japanese Patent Application No. 2020-120729 filed on Jul. 14, 2020. The entire disclosure of all of the above applications is incorporated herein by reference.

TECHNICAL FIELD

The present disclosure relates to a rotating electrical machine.

BACKGROUND

Conventionally, in a stator of an inner rotor type rotating electrical machine, when manufacturing winding by nozzle winding for cost reduction, a winding work is performed after winding the end of the electric wire around a jig arranged outside an outermost diameter of a stator core.

SUMMARY

In the present disclosure, a rotating electrical machine of inner rotor type includes a stator core having an annular yoke and a plurality of teeth, a plurality of windings having coils wound around the teeth, a plurality of winding holding portions holding one end portion or the other end portion of the winding, a plurality of coil terminals having a winding connection portion connected to the winding, and a plurality of motor terminals connectable to an external power supply terminal.

The winding has two or more coils between one end portion and the other end portion of the winding. When a direction perpendicular to a rotation axis of the rotating electrical machine is defined as a radial direction, the winding holding portion and the winding connection portion are arranged inside the coil in the radial direction.

The motor terminal includes a connector portion connectable to the external power supply terminal, a contacted portion contacted by the contact portion of the coil terminal in the axial direction, and a connecting portion that connects the connector portion and the contacted portion. At least a portion of the connecting portion extends from the connector portion to the contacted portion through an opposite side to the stator core with respect to a metal plate.

BRIEF DESCRIPTION OF DRAWINGS

The above and other objects, features and advantages of the present disclosure will become more apparent from the following detailed description made with reference to the accompanying drawings.

In the drawings.

DETAILED DESCRIPTION

Figure 1:
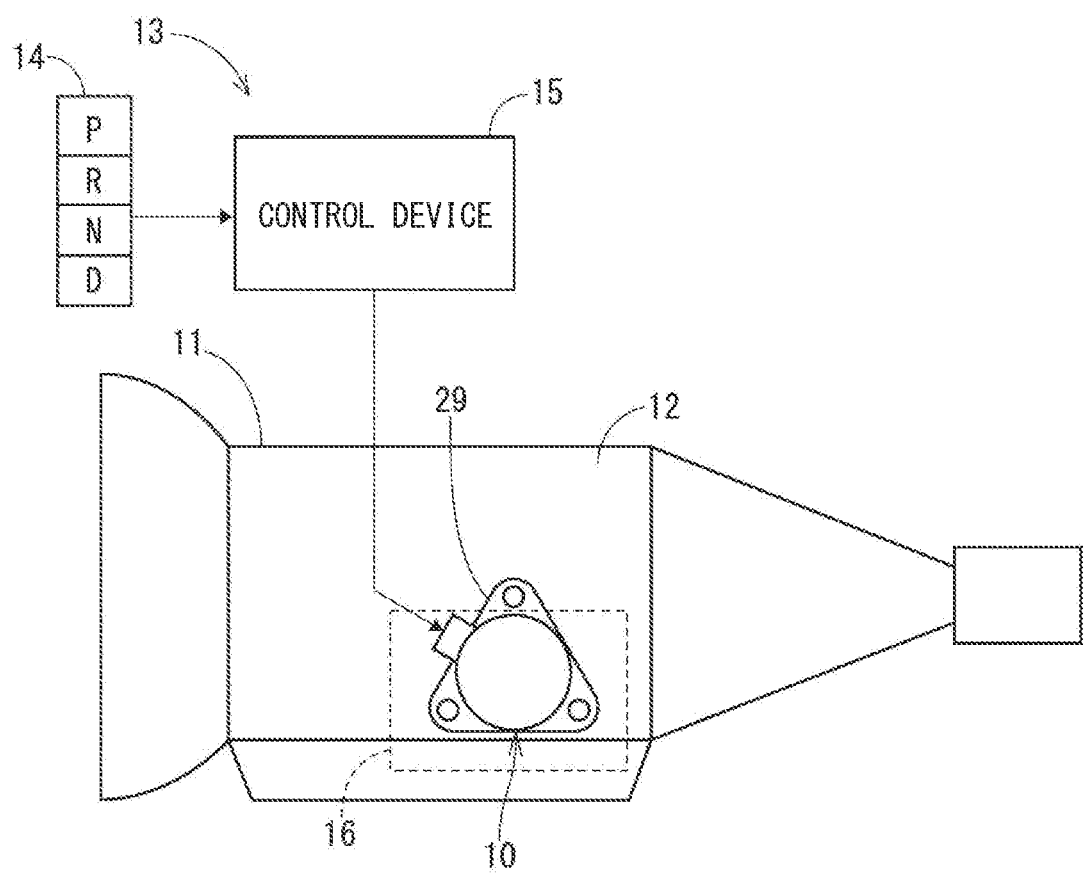
FIG. 1 is a schematic diagram illustrating a shift-by-wire system to which a rotary actuator with a motor of a first embodiment is applied.

In an assumable example, in a stator of an inner rotor type rotating electrical machine, when manufacturing winding by nozzle winding for cost reduction, a winding work is performed after winding the end of the electric wire around a jig arranged outside an outermost diameter of a stator core. Therefore, a coil terminal for a contact is arranged on the outer periphery of the stator, and a connection point between the coil terminal and the winding is positioned outside the outermost diameter of the stator core.

When the windings are manufactured by nozzle winding, the coil terminal is provided so as to protrude outward from the stator core in the radial direction so that a radial size of the rotating electrical machine is increased. Therefore, it is difficult to achieve both cost reduction and miniaturization. In the present disclosure, the rotating electrical machine that is inexpensive and compact is provided.

In the present disclosure, a rotating electrical machine of inner rotor type includes a stator core having an annular yoke and a plurality of teeth, a plurality of windings having coils wound around the teeth, a plurality of winding holding portions holding one end portion or the other end portion of the winding, a plurality of coil terminals having a winding connection portion connected to the winding, and a plurality of motor terminals connectable to the external power supply terminals.

The winding has two or more coils between one end portion and the other end portion of the winding. When a direction perpendicular to a rotation axis of the rotating electrical machine is defined as a radial direction, the winding holding portion and the winding connection portion are arranged inside the coil in the radial direction.

The motor terminal includes a connector portion connectable to the external power supply terminal, a contacted portion contacted by the contact portion of the coil terminal in the axial direction, and a connecting portion that connects the connector portion and the contacted portion. At least a portion of the connecting portion extends from the connector portion to the contacted portion through an opposite side to the stator core with respect to the metal plate.

As a result, by using the winding holding portion and the winding connection portion located in the inner peripheral portion of the stator, the nozzle winding in which two or more teeth are continuously wound from the winding start to the winding end of the winding can be implemented. Therefore, it is possible to prevent the coil terminal from protruding outward in the radial direction while adopting a nozzle winding that can be manufactured at low cost. Therefore, an inexpensive and small rotating electrical machine can be obtained.

Further, by directly connecting the coil terminal and the motor terminal, connection parts such as bus bars are not required, and the number of parts can be reduced. In addition, since there are no connection parts, the stator can be arranged closer to the motor terminal side, and the rotating electrical machine can be made smaller.

Here, a problem arises as to how to wire the motor terminal to the coil terminal due to the existence of the plate by eliminating the connection parts such as the bus bar. In contrast, in the present disclosure, at least part of the connecting portion passes on the opposite side (that is, outside the metal plate) of the stator core with respect to the metal plate, thereby solving the above problem. As an example, through holes are provided in the metal plate at positions corresponding to the respective coil terminals, and through the connector portion, the motor terminal is formed to extend from the connector portion to the contacted portion via the through hole through the outside of the metal plate. As a result, the motor terminals can be arranged without making a large notch in the plate continuously in the circumferential direction toward the coil terminals scattered within a relatively long range in the circumferential direction.

Hereinafter, a plurality of embodiments of a motor as a rotating electrical machine will be described below with reference to the drawings. In the embodiments, components which are substantially similar to each other are denoted by the same reference numerals and redundant description thereof is omitted.

First Embodiment

As shown in FIG. 1, a motor 30 as an inner rotor type rotating electrical machine of a first embodiment is provided in a rotary actuator (hereinafter, actuator) 10. The actuator 10 of the first embodiment is fixed to an outer wall of a case 12 of a vehicle transmission 11 and is used as a power source of a shift-by-wire system 13. In the shift-by-wire system 13, a control device 15 controls the actuator 10 in response to a command signal from a shift operation device 14 to operate a shift range switching mechanism 16 of the transmission 11 to switch a shift range.

(Actuator)

First, an overall configuration of the actuator 10 will be described with reference to FIG. 2. The actuator 10 includes a housing 20, a motor 30, and a speed reducer 40.

The housing 20 has a cup-shaped front housing 21 and a cup-shaped rear housing 22. An opening of the front housing 21 and an opening of the rear housing 22 are combined, and the front housing 21 and the rear housing 22 are fastened to each other by bolts 23. A bottomed cylindrical metal plate 24 is inserted into the front housing 21. The rear housing 22 has a tubular protrusion 28 that projects to an opposite side of the front housing 21. A bracket 29 is fixed to an outer wall of the rear housing 22. The actuator 10 is fixed to the case 12 (see FIG. 1) of the transmission 11 by using the bracket 29.

The motor 30 has a stator 31 and a rotor 34 housed in the housing 20. The stator 31 has a stator core 32 fixed to the metal plate 24 by, for example, press fitting, and a winding 33 provided on the stator core 32. The rotor 34 has a rotary shaft 37 rotatably supported around a rotation axis AX1 by a motor side bearing 35 and a speed reducer side bearing 36, and a rotor core 38 fitted and fixed to an outside of the rotary shaft 37. The motor side bearing 35 is provided on the metal plate 24. The speed reducer side bearing 36 is provided on an output member 44, which will be described later.

The speed reducer 40 includes an eccentric shaft 41, a ring gear 42, an eccentric gear 43, an output member 44, and a transmission mechanism 45. The eccentric shaft 41 is provided on an eccentric axis AX2 that is eccentric with respect to the rotation axis AX1, and is integrally formed with the rotary shaft 37. The ring gear 42 is provided coaxially with the rotation axis AX1 and is fixed to the rear housing 22. The eccentric gear 43 has an external tooth portion 47 that meshes with an internal tooth portion 46 of the ring gear 42, and is supported by a bearing 48 provided on the eccentric shaft 41 so as to allow a planetary motion. The planetary motion is a motion that revolves around the rotation axis AX1 while rotating around the eccentric axis AX2. The rotation velocity of the eccentric gear 43 during planetary motion is changed with respect to the rotation speed of the rotary shaft 37.

The output member 44 is provided coaxially with the rotation axis AX1 and is rotatably supported by a bearing 49 provided in the rear housing 22. The transmission mechanism 45 is composed of an engaging protrusion 51 formed in the eccentric gear 43 and an engaging hole 52 formed in the output member 44 into which the engaging protrusion 51 is inserted, and transmits the rotation of the eccentric gear 43 around the eccentric axis AX2 to the output member 44.

In the actuator 10, a rotating magnetic field is generated by switching an energizing phase of the winding 33, and the rotor 34 rotates under the magnetic attraction force or the reaction force generated by the rotating magnetic field. When the eccentric shaft 41 rotates around the rotation axis AX1 together with the rotor 34, the eccentric gear 43 makes a planetary motion, and the rotation of the eccentric gear 43 decelerated with respect to the rotation of the rotor 34 is output from the output member 44 to the outside.

(Stator)

Next, the stator 31 and its wiring will be described with reference to FIGS. 2 to 7. In the following description, a direction parallel to a rotation axis AX1 is simply described as "axial direction", a direction around the rotation axis AX1 is simply described as "circumferential direction", and a direction orthogonal to the rotation axis AX1 is simply described as "radial direction". Further, a portion outside the component of the actuator 10 is referred to as "outside".

Figure 2:
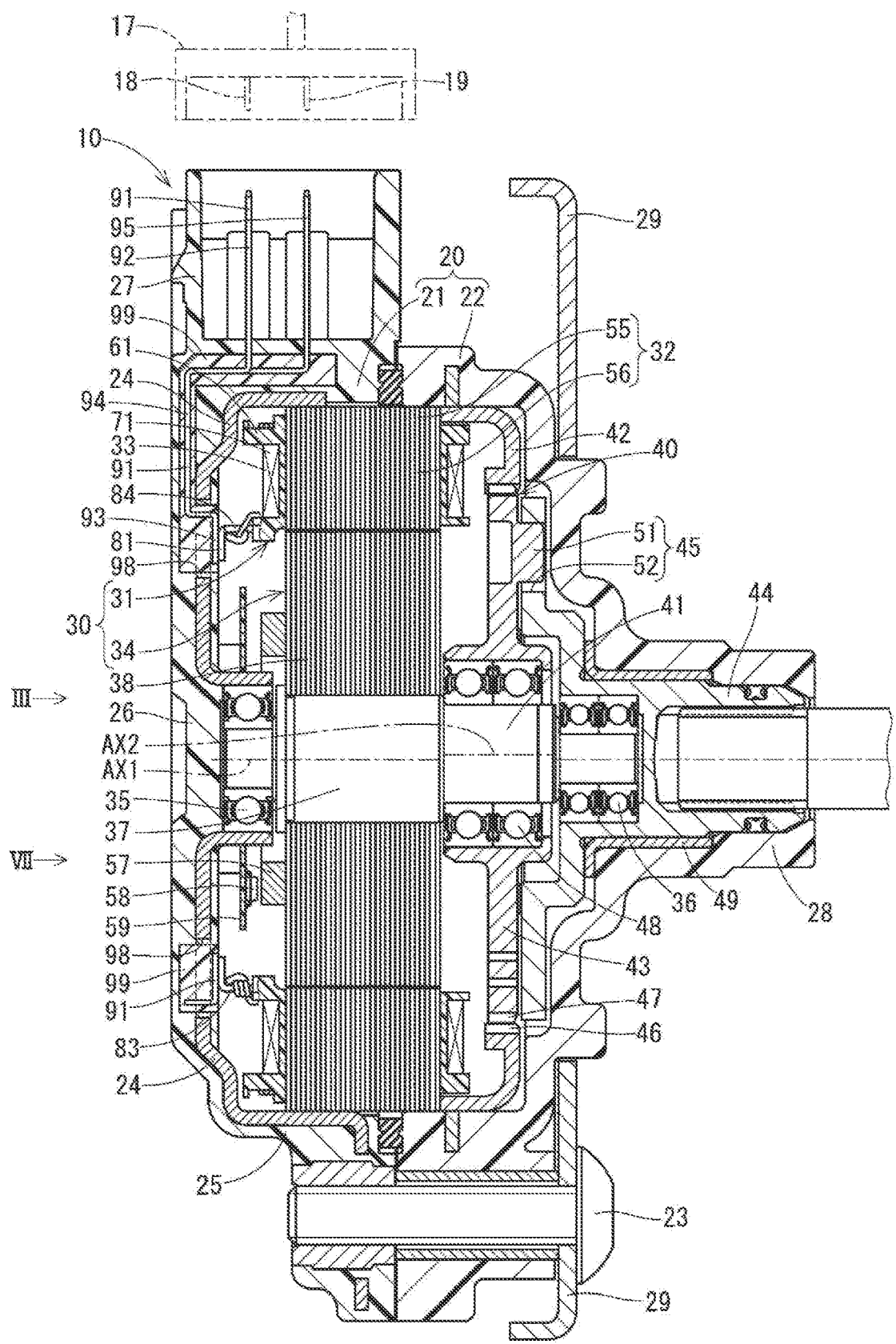
FIG. 2 is a cross-sectional view of the rotary actuator of FIG. 1.
Figure 3:
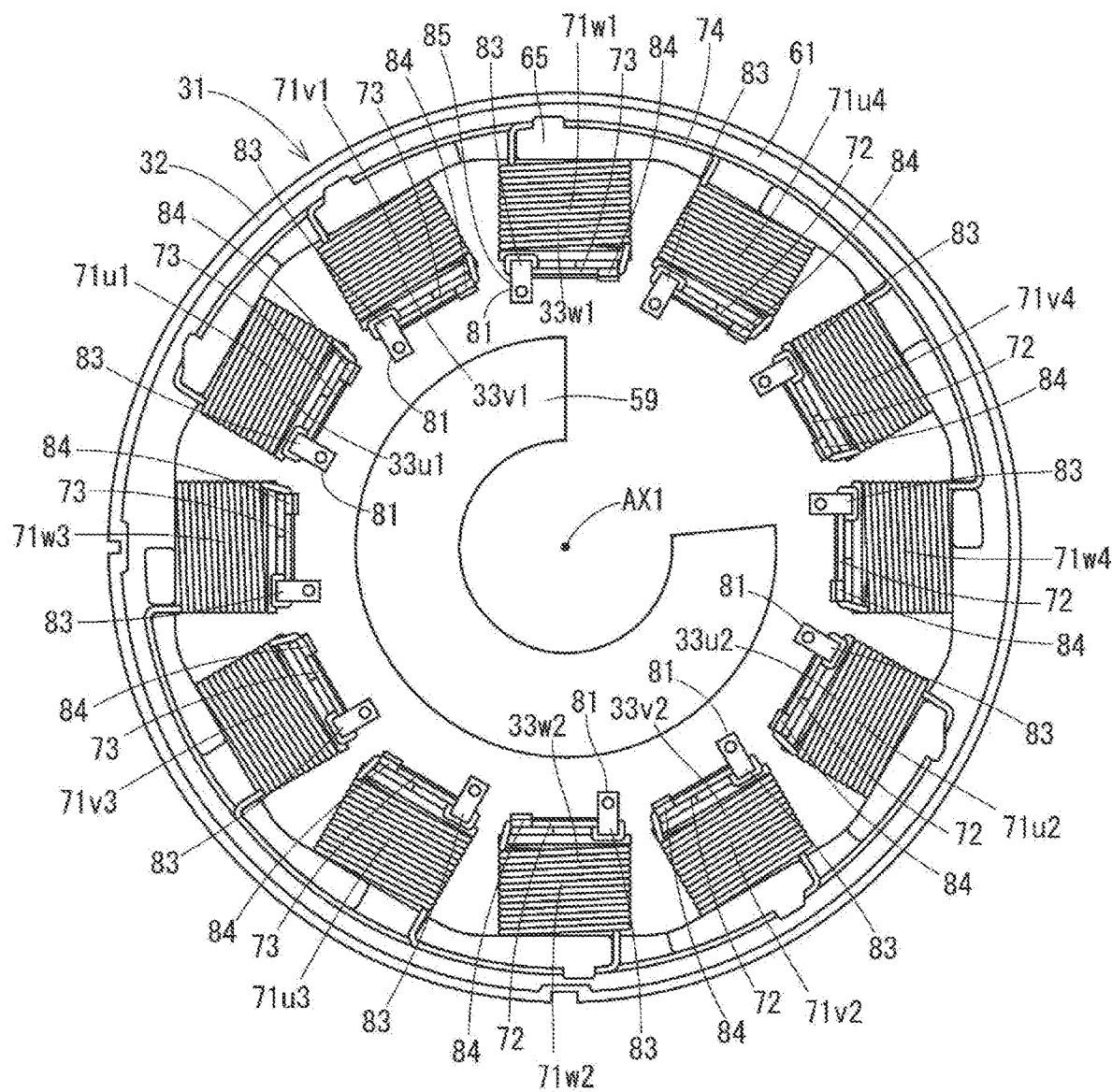
FIG. 3 is a view of the stator and a control board of FIG. 2 as viewed from a direction of arrow III.

As shown in FIGS. 2 and 3, the stator 31 includes a stator core 32, a plurality of windings 33, an insulator 61 interposed between the stator core 32 and the windings 33, and a plurality of coil terminals 81 connected to the windings 33.

The stator core 32 is composed of a plurality of metal plates laminated in the axial direction. The stator core 32 has an annular yoke 55 fixed to an inner wall of the tubular portion 25 of the front housing 21, and a plurality of teeth 56 formed so as to project inward from the yoke 55 in the radial direction.

Figure 4:
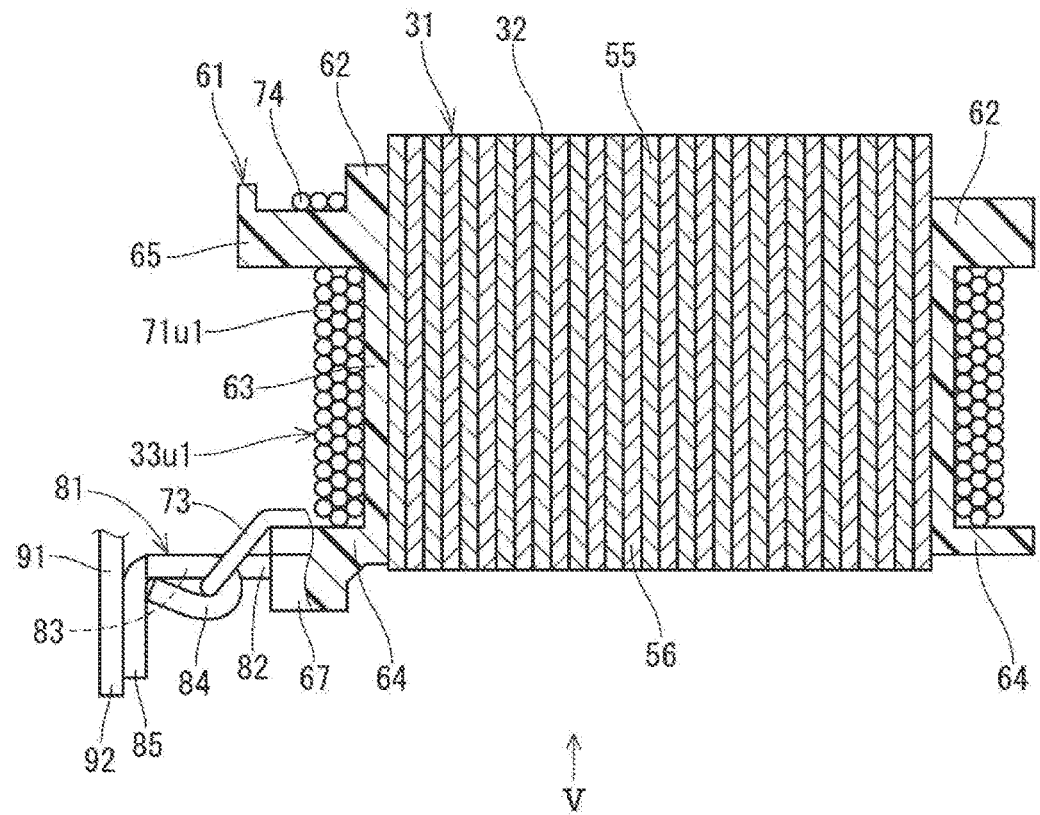
FIG. 4 is an enlarged view of a main part of the stator of FIG. 2.
Figure 5:
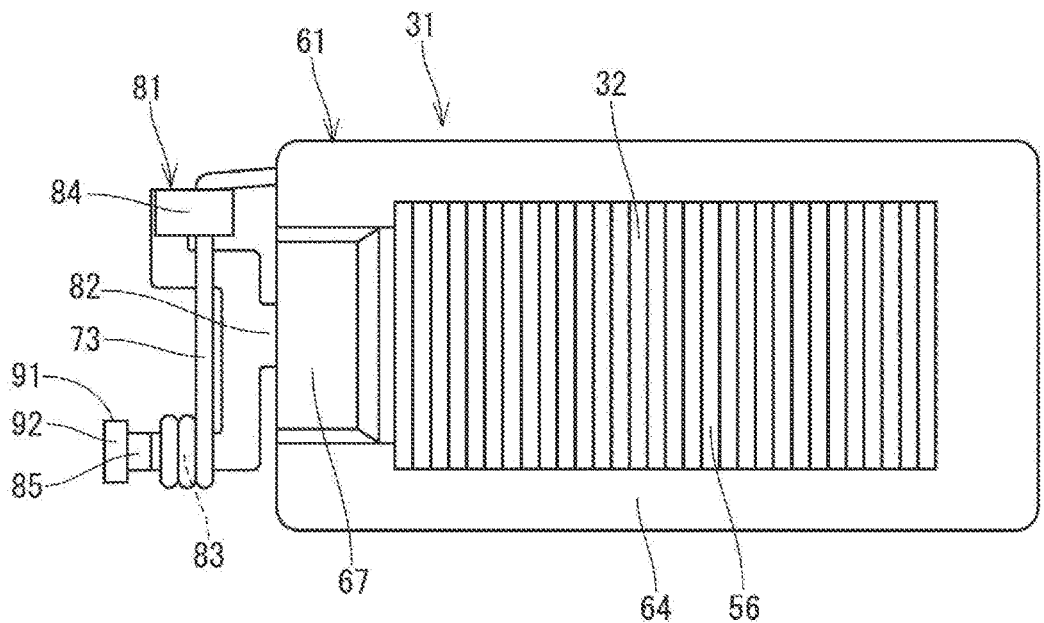
FIG. 5 is a view of the stator of FIG. 4 as viewed from a direction of arrow V.

As shown in FIGS. 3 to 5, the insulator 61 includes a yoke insulating portion 62 provided on both axial ends of the yoke 55 and an inner wall of the yoke 55 on the inner side in the radial direction, a tooth insulating portion 63 provided on a portion around the teeth 56 (that is, other than a tip surface of the teeth 56), and a flange portion 64 provided so as to protrude in the axial direction and the circumferential direction from the tooth tip side of the tooth insulating portion 63. The insulator 61 is assembled to the stator core 32.

Figure 6:
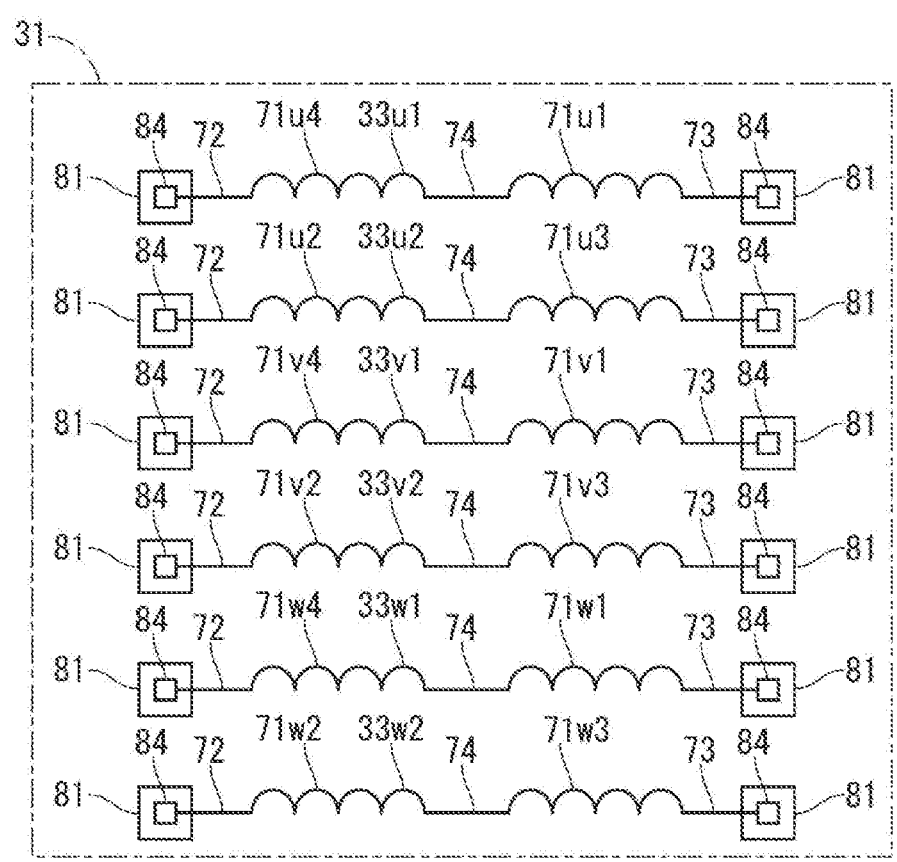
FIG. 6 is a diagram schematically showing windings and coil terminals of FIG. 3.

As shown in FIGS. 3 and 6, the multiple windings 33 include U-phase windings 33$u$1 and 33$u$2, V-phase windings 33$v$1 and 33$v$2, and W-phase windings 33$w$1 and 33$w$2. U-phase winding 33$u$1, V-phase winding 33$v$1 and W-phase winding 33$w$1 constitute a winding set in a first system, and U-phase winding 33$u$2, V-phase winding 33$v$2 and W-phase winding 33$w$2 constitute a winding set in a second system. The winding 33 is made redundant by providing two systems. Hereinafter, when each winding is not distinguished, it is simply described as "winding 33".

The winding 33 has a coil 71 wound around the tooth 56, that is, around the tooth insulating portion 63 of the insulator 61. One winding 33 is composed of one electric wire, and has two coils 71 between one end portion 72 and the other end portion 73 thereof. A crossover line 74 is provided between the coils 71. That is, one winding 33 is provided over two teeth 56.

U-phase winding 33$u$1 has coils 71$u$1 and 71$u$4, and U-phase winding 33$u$2 has coils 71$u$2 and 71$u$3. V-phase winding 33$v$1 has coils 71$v$1 and 71$v$4, and V-phase winding 33$v$2 has coils 71$v$2 and 71$v$3. W-phase winding 33$w$1 has coils 71$w$1 and 71$w$4, and W-phase winding 33$w$2 has coils 71$w$2 and 71$w$3. In the first embodiment, twelve teeth 56 are provided, and one coil 71 is provided for each tooth 56. One winding 33 is the coil 71 for one phase.

As shown in FIGS. 2 to 4, the yoke insulating portion 62 has a protruding locking portion 65 protruding toward the bottom portion 26 side of the front housing 21. The locking portion 65 locks the crossover line 74. In the first embodiment, the locking portion 65 is integrally provided with the insulator 61.

As shown in FIGS. 2 and 3, the actuator 10 includes a magnet 57 provided on the rotor core 38, a magnetic sensor 58 that is an element for detecting the rotation position of the rotor 34 and detects the magnetism of the magnet 57, and a control board 59 on which the magnetic sensor 58 is mounted.

As shown in FIG. 2, the front housing 21 has a bottom portion 26, a tubular portion 25, and a connector portion 27 that form a resin main body portion. The connector portion 27 is formed on the outside of the tubular portion 25. An external connector 17 is detachably connected to the connector portion 27. The external connector 17 holds an external power supply terminal 18 and an external signal terminal 19.

As shown in FIGS. 2, 4, 5 and 7, the front housing 21 holds a plurality of motor terminals 91 and a plurality of sensor terminals 95. The motor terminal 91 is connected to the coil terminal 81 and can be directly connected to the external power supply terminal 18. The sensor terminal 95 is connected to the control board 59 and is connectable to the external signal terminal 19. The motor terminal 91 and the sensor terminal 95 are inserted into the main body of the front housing 21 and extend from the connector portion 27 through the tubular portion 25 to the bottom portion 26. In the first embodiment, the motor terminal 91 and the sensor terminal 95 are inserted into the front housing 21 while being held by a primary molded body 99.

As shown in FIGS. 4 and 5, a terminal holding portion 67 for holding the coil terminal 81 is provided in the flange portion 64 on the bottom portion 26 side of the front housing 21. In the first embodiment, the terminal holding portion 67 is provided integrally with the insulator 61.

The coil terminal 81 includes a held portion 82 held by the terminal holding portion 67, a winding holding portion 83 holding one end portion 72 or the other end portion 73 of the winding 33, a winding connection portion 84 electrically connected to the winding 33, and a contact portion 85 contacting and electrically connecting to the motor terminal 91. In the first embodiment, the winding holding portion 83 is provided integrally with the coil terminal 81.

One coil terminal 81 is provided for each tooth 56. As shown in FIGS. 3 and 6, among the twelve coil terminals 81, six coil terminals 81 are connected to one end portion 72, and the other six coil terminals 81 are connected to the other end portion 73.

As shown in FIGS. 2 to 6, the coil terminals 81 are provided at both ends of the winding 33, and two coil terminals 81 are provided for each phase of the winding. One end portion 72, which is a winding start portion of the winding 33, extends from the winding holding portion 83 to the tooth 56 through the winding connection portion 84. The other end portion 73, which is a winding end portion of the winding 33, extends from the tooth 56 to the winding holding portion 83 through the winding connection portion 84.

The motor terminal 91 includes a connector portion 92 connectable to the external power supply terminal 18, a contacted portion 93 extending in a direction perpendicular to the axial direction and contacted by the contact portion 85 of the coil terminal 81 in the axial direction, and a connecting portion 94 that connects the connector portion 92 and the contacted portion 93. The coil terminal 81 is directly connected to the motor terminal 91 without a connecting part such as a bus bar. In the first embodiment, the contact portion 85 and the contacted portion 93 are welded together. Hereinafter, the connecting portion between the contact portion 85 and the contacted portion 93 is referred to as a "welded portion".

The winding holding portion 83 and the winding connection portion 84 are arranged inward of the coil 71 in the radial direction, and the welded portion is arranged inward of the tips of the teeth of the stator core 32 in the radial direction. Specifically, as shown in FIGS. 4 and 5, the winding holding portion 83 and the winding connection portion 84 are formed to extend from the held portion 82 toward the bottom portion 26 in the axial direction. The contact portion 85 is formed to extend inward in the radial direction from the tip of the winding holding portion 83. In the first embodiment, the winding holding portion 83 and the winding connection portion 84 are branched from the held portion 82 respectively.

The winding 33 is manufactured by nozzle winding. Specifically, the electric wire is entwined around the winding holding portion 83 and passed through the winding connection portion 84, and then wound around the first tooth insulating portion 63. Subsequently, after the electric wire pulled out from the first tooth insulating portion 63 is engaged with the locking portion 65, the electric wire is wound around the second tooth insulating portion 63. Finally, the electric wire pulled out from the second tooth insulating portion 63 is passed through another winding connection portion 84 different from the winding connection portion 84, and then entwined with the winding holding portion 83. The winding connection portion 84 and the winding 33 are connected by fusing or the like, for example.

As described above, the winding work of the electric wire is performed across a plurality of slots. When using the locking portion 65 arranged on the outer peripheral portion of the stator 31 and the winding holding portion 83 and the winding connection portion 84 arranged on the inner peripheral portion, complete alignment winding is realized by setting the number of winding layers of the wire to the tooth insulating portion 63 to be an odd number. The first and third layers of the winding 33 are wound from the inner side to the outer side in the radial direction, and the second layer of the winding 33 is wound from the outer side to the inner side in the radial direction.

Figure 7:
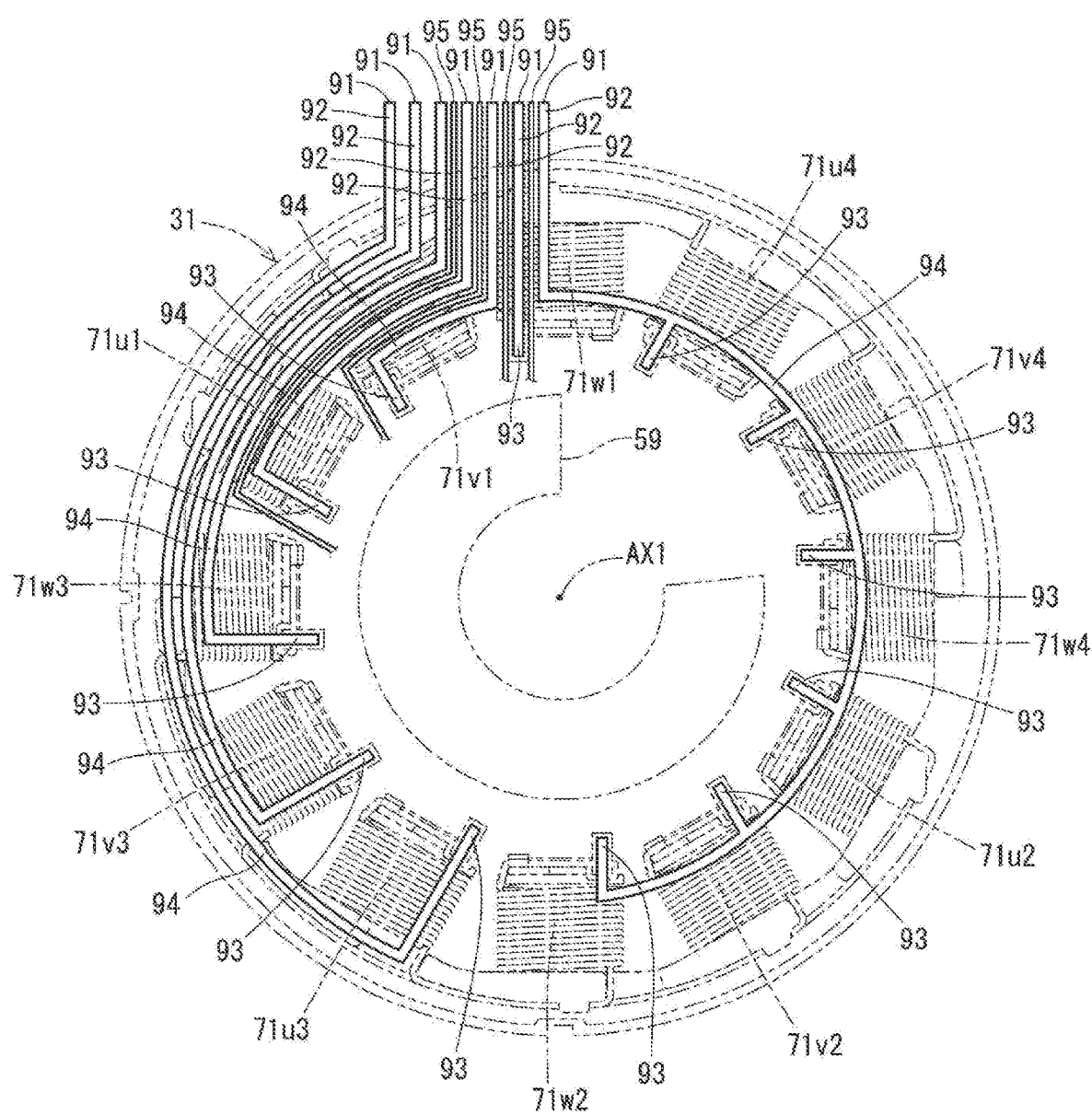
FIG. 7 is a view of the stator, motor terminal, and sensor terminal of FIG. 2 as viewed from a direction of arrow VII.

As shown in FIGS. 2 and 7, at least a portion of the connecting portion 94 extends from the connector portion 92 to the contacted portion 93 through an opposite side (hereinafter referred to as the outside of the metal plate 24) to the stator core 32 with respect to the metal plate 24. Specifically, through holes 98 are provided in the metal plate 24 at locations corresponding to the respective coil terminals 81, and the connecting portion 94 passes from the connector portion 92 to the outside of the metal plate 24 and extends to the contacted portion 93 passing through the through holes 98.

Five connecting portions 94 of the six connection portions 94 have circumferentially extending parts extending in the circumferential direction away from the connector portion 92 outside the metal plate 24. Another connecting portion 94 has a radially extending part outside the metal plate 24. Although the motor terminals 91 are arranged substantially around the entire circumference, the through hole 98 may be of a size that allows the contacted portion 93 and a part of the primary molded body 99 covering therearound to pass through. The plurality of through holes 98 are provided at intervals in the circumferential direction. A motor terminal of the plurality of motor terminals in which the connection portion 94 and the contacted portion 93 are located at different positions in the circumferential direction is defined as a specific motor terminal.

The motor terminal 91 and the sensor terminal 95 are arranged so as not to overlap other motor terminals 91 and other sensor terminals 95 in the axial direction in a region inside the yoke 55 in the radial direction. The circumferentially extending part of the connecting portions 94 of each motor terminal 91 is arranged apart from each other in the radial direction. In the first embodiment, five GND lines extend from the connector portion 92 in one circumferential direction, and one power line extends from the connector portion 92 in the other circumferential direction. The sensor terminal 95 extends from the connector portion 92 to the control board 59 through between the motor terminals 91.

(Effects)

As described above, in the first embodiment, the motor 30 includes a stator core 32 having an annular yoke 55 and a plurality of teeth 56, a plurality of windings 33 having coils 71 wound around the teeth 56, a plurality of winding holding portions 83 holding one end portion 72 or the other end portion 73 of the winding 33, a plurality of coil terminals 81 having a winding connection portion 84 connected to the winding 33, and a plurality of motor terminals 91 connected to the coil terminals 81 and connectable to the external power supply terminals 18.

The winding 33 has two or more coils 71 between one end portion 72 and the other end portion 73 of the winding 33. The winding holding portion 83 and the winding connection portion 84 are arranged inward of the coil 71 in the radial direction.

The motor terminal 91 includes a connector portion 92 connectable to the external power supply terminal 18, a contacted portion 93 contacted by the contact portion 85 of the coil terminal 81 in the axial direction, and a connecting portion 94 that connects the connector portion 92 and the contacted portion 93. At least a portion of the connecting portion 94 extends from the connector portion 92 to the contacted portion 93 through an opposite side to the stator core 32 with respect to the metal plate 24.

As a result, by using the winding holding portion 83 and the winding connection portion 84 located in the inner peripheral portion of the stator 31, the nozzle winding in which two or more teeth 56 are continuously wound from the winding start to the winding end of the winding 33 can be implemented. Therefore, it is possible to prevent the coil terminal 81 from protruding outward in the radial direction while adopting a nozzle winding that can be manufactured at low cost. Therefore, an inexpensive and compact motor 30 can be obtained.

Further, by directly connecting the coil terminal 81 and the motor terminal 91, connection parts such as bus bars are not required, and the number of parts can be reduced. In addition, since there are no connection parts, the stator 31 can be arranged closer to the motor terminal 91 side, and the motor 30 can be made smaller.

Here, a problem arises as to how to wire the motor terminal 91 to the coil terminal 81 due to the existence of the metal plate 24 by eliminating the connection parts such as the bus bar. In contrast, in the first embodiment, part of the connecting portion 94 passes on the opposite side (that is, outside the metal plate 24) of the stator core 32 with respect to the metal plate 24, thereby solving the above problem. Specifically, through holes 98 are provided in the metal plate 24 at positions corresponding to the respective coil terminals 81, and through the connector portion 92, the motor terminal 91 is formed to extend from the connector portion 92 to the contacted portion 93 via the through hole 98 through the outside of the metal plate 24. As a result, the motor terminals 91 can be arranged without making a large notch in the metal plate 24 continuously in the circumferential direction toward the coil terminals 81 scattered within a relatively long range in the circumferential direction.

Further, in the first embodiment, the motor terminal 91 and the sensor terminal 95 are arranged so as not to overlap other motor terminals 91 and other sensor terminals 95 in the axial direction in a region inside the yoke 55 in the radial direction. As a result, a space for arranging the motor terminal 91 and the sensor terminal 95 in the axial direction is reduced, and the axial length of the motor 30 can be shortened.

Further, in the first embodiment, the one end portion 72 extends from the winding holding portion 83 through the winding connection portion 84 to the teeth 56. The other end portion 73 extends from the teeth 56 to the winding holding portion 83 through the winding connection portion 84. Therefore, by passing the electric wire through the winding connection portion 84 in the winding process of the winding 33, in the process of connecting the winding connection portion 84 and the winding 33, the winding 33 need not be manipulated, and only crimping needs to be performed, so that the connection process can be simplified.

Second Embodiment

Figure 8:
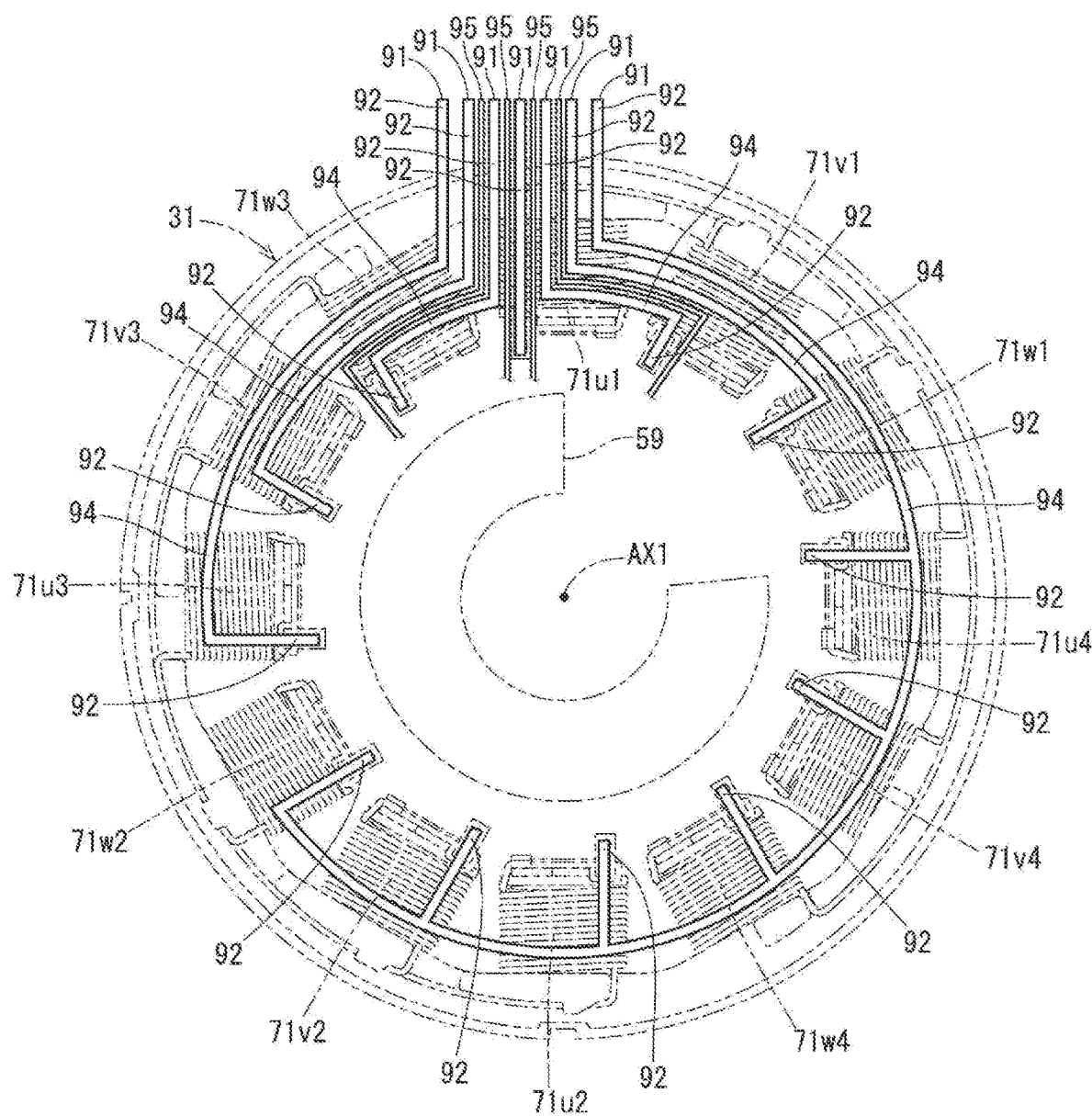
FIG. 8 is a view of the stator, motor terminal, and sensor terminal of a second embodiment as viewed from an axial direction.

In a second embodiment, as shown in FIG. 8, regarding the motor terminal 91, three GND lines extend from the connector portion 92 to one side in the circumferential direction, and two GND lines and one power supply line extend from the connector portion 92 to the other side in the circumferential direction. By arranging the motor terminals 91 in this way, it is possible to minimize radial overlap of the circumferentially extending parts of the connecting portions 94.

Third Embodiment

Figure 9:
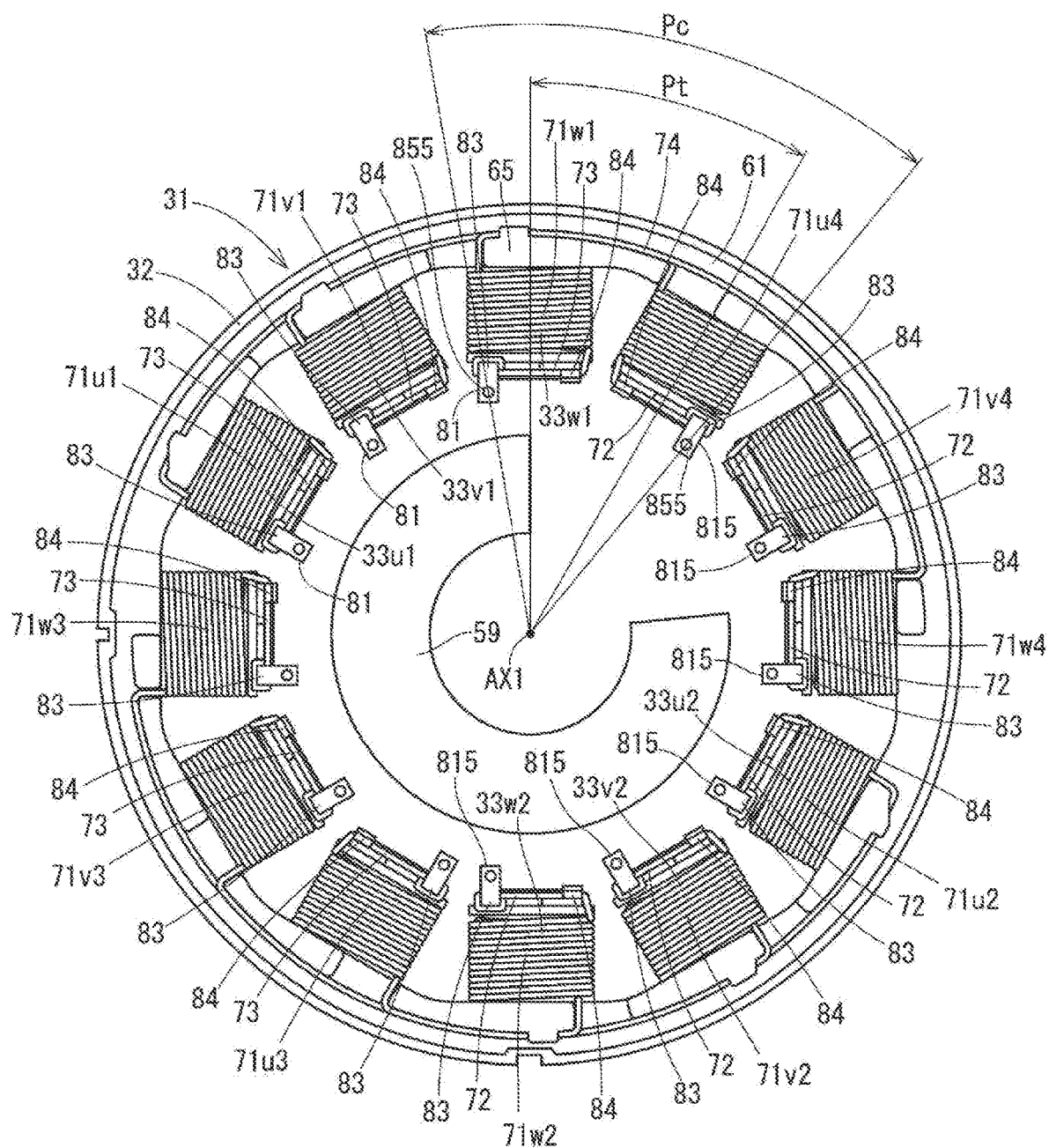
FIG. 9 is a view of the stator and a control board of a third embodiment as viewed from an axial direction.
Figure 10:
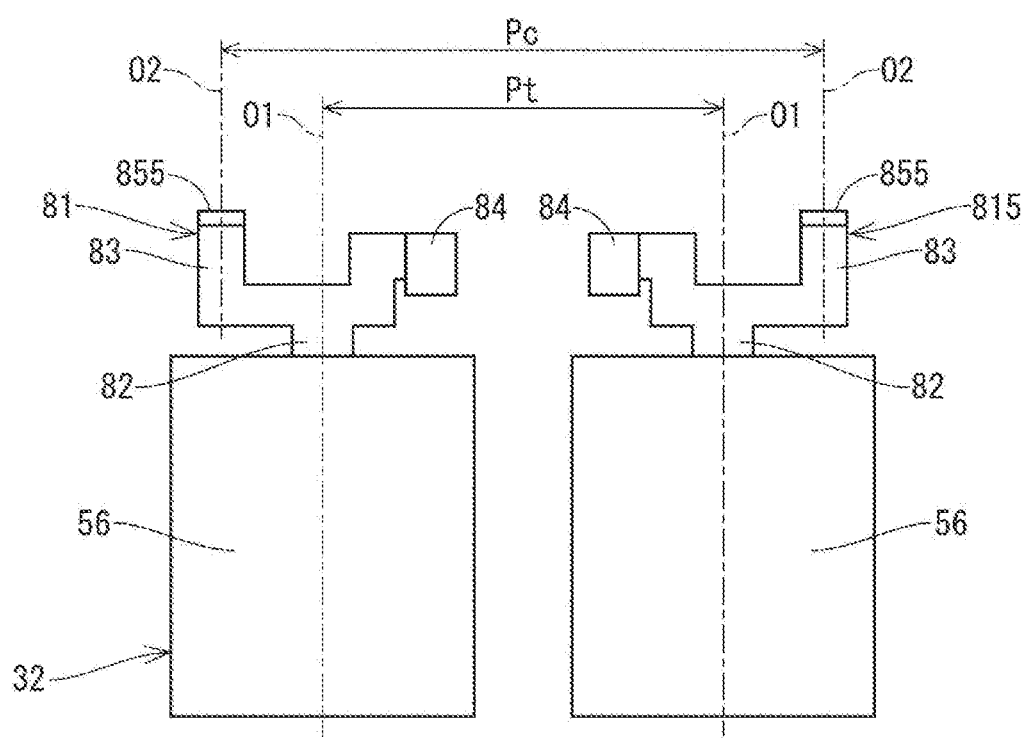
FIG. 10 is a diagram schematically showing a specific contact portion and its peripheral configuration of FIG. 9.
Figure 11:
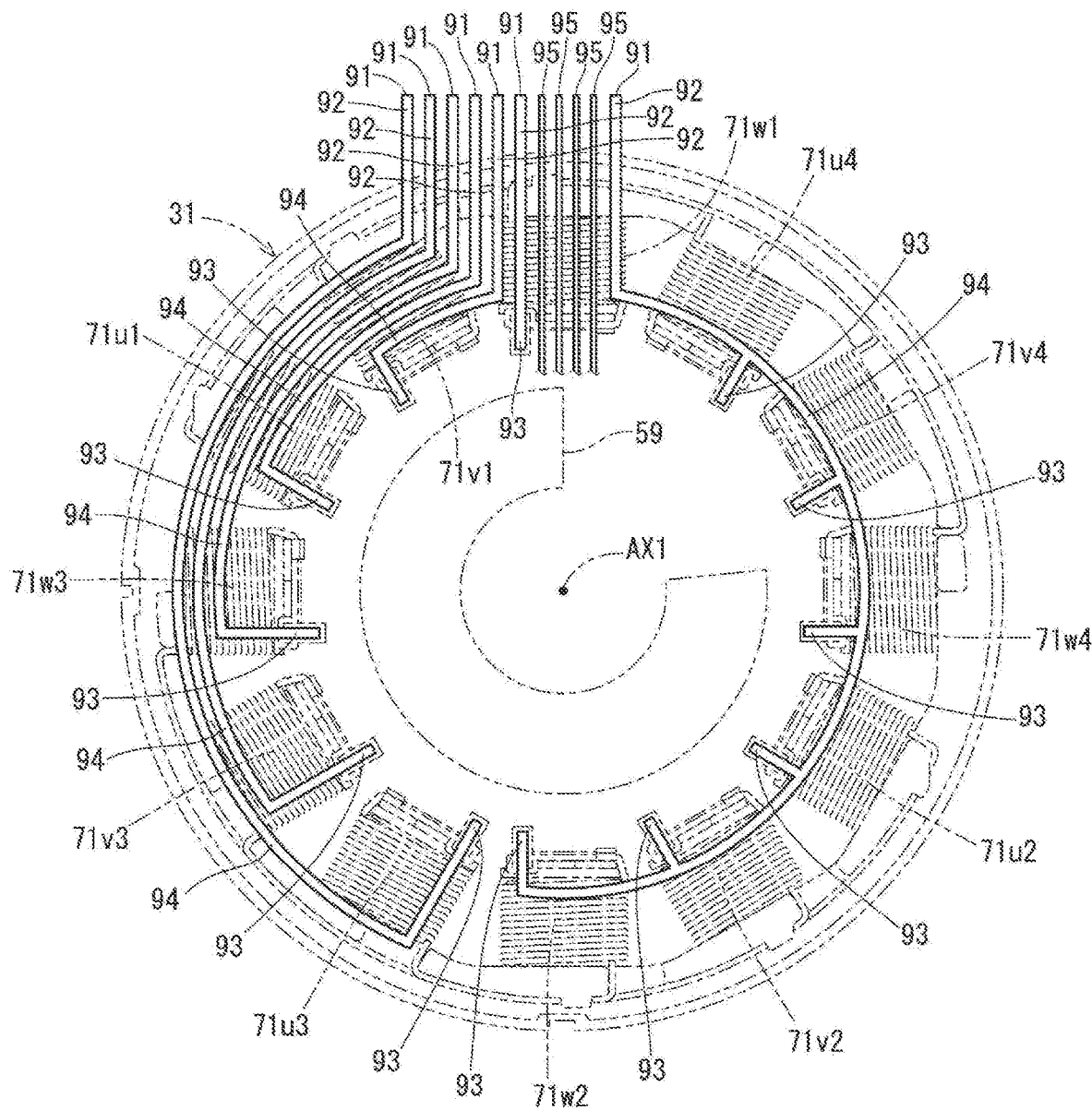
FIG. 11 is a view of the stator, motor terminal, and sensor terminal of FIG. 9 as viewed from the axial direction.

In a third embodiment, as shown in FIGS. 9 to 11, an interval between two contact portions 85 adjacent in the circumferential direction is defined as a contact portion pitch Pc, and an interval between two teeth 56 adjacent in the circumferential direction is defined as a tooth pitch Pt. The two specific contact portions 85 (hereinafter, it is referred to as a specific contact portion 855) are provided such that the contact portion pitch Pc is larger than the tooth pitch Pt. The sensor terminal 95 is arranged so as to pass between the two specific contact portions 855 when viewed in the axial direction.

To widen the interval between the two specific contact portions 855, a method of shifting a center O2 of at least one of the contact portions 855 with respect to a center O1 of the teeth 56 is adopted. In the third embodiment, the center O2 of the first specific contact portion 855 is arranged on the side opposite to the second specific contact portion 855 with respect to the center O1. Further, the center O2 of the second specific contact portion 855 is arranged on the side opposite to the first specific contact portion 855 with respect to the center O1. The second coil terminal 815 having the second specific contact portion 855 has a shape that is a mirror copy of the first coil terminal 81 having the first specific contact portion 855.

By arranging the sensor terminal 95 between the two specific contact portions 85 with an increased interval in this manner, the motor terminal 91 and the sensor terminal 95 can be arranged so as not to overlap in the axial direction. As a result, a space for arranging the motor terminal 91 and the sensor terminal 95 in the axial direction is reduced, and the axial length of the motor 30 can be shortened.

Fourth Embodiment

Figure 12:
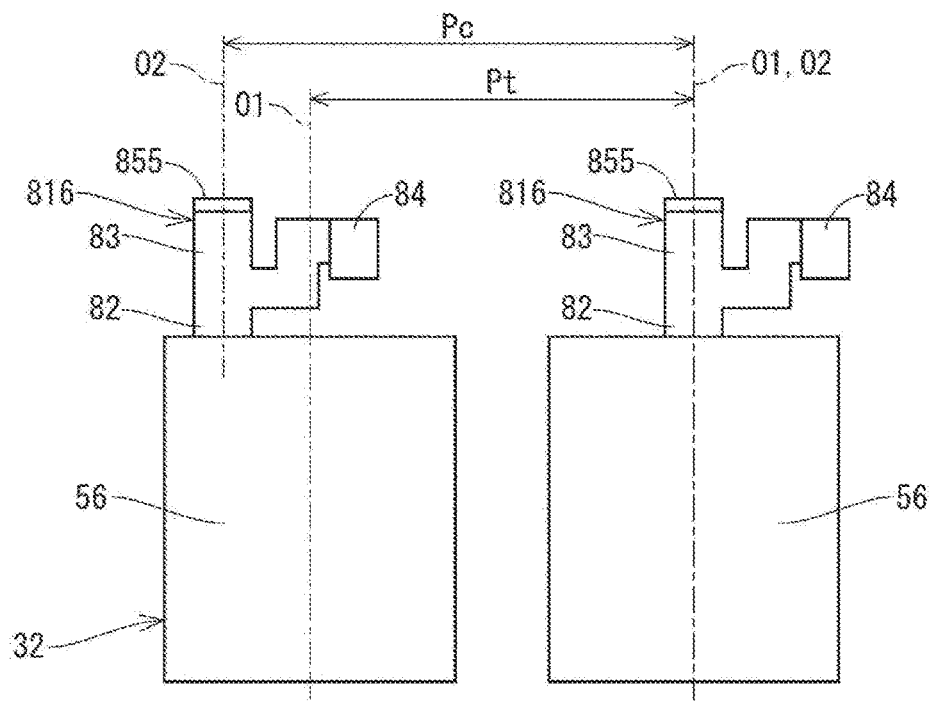
FIG. 12 is a diagram schematically showing a specific contact portion and its peripheral configuration of a fourth embodiment.

In a fourth embodiment, as shown in FIG. 12, the center O2 of the second specific contact portion 855 is arranged to coincide with the center O1, and the center O2 of the first specific contact portion 855 is arranged on the side opposite to the second specific contact portion 855 with respect to the center O1. By using the coil terminals 816 having same shape and changing the holding positions of the coil terminals 816, the interval between the two specific contact portions 855 is widened. Accordingly, the same effects as those of the third embodiment can be obtained without increasing the variations of the coil terminal 816.

Fifth Embodiment

Figure 13:
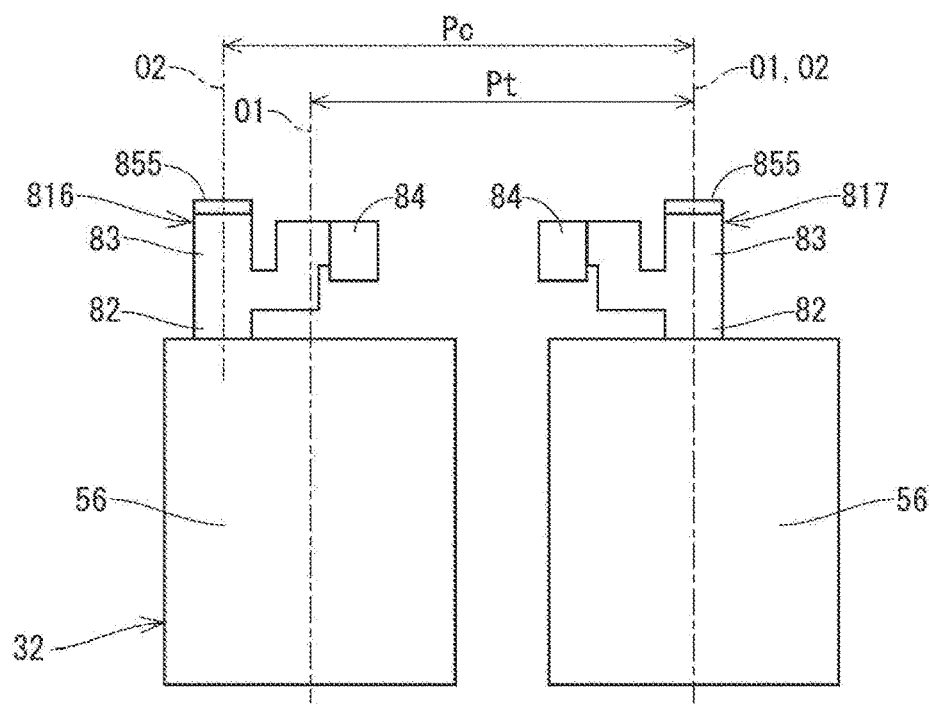
FIG. 13 is a diagram schematically showing a specific contact portion and its peripheral configuration of a fifth embodiment.

In a fifth embodiment, as shown in FIG. 13, a coil terminal 817 having the second specific contact portion 855 has a shape that is a mirror copy of the coil terminal 816 having the first specific contact portion 855.

Sixth Embodiment

Figure 14:
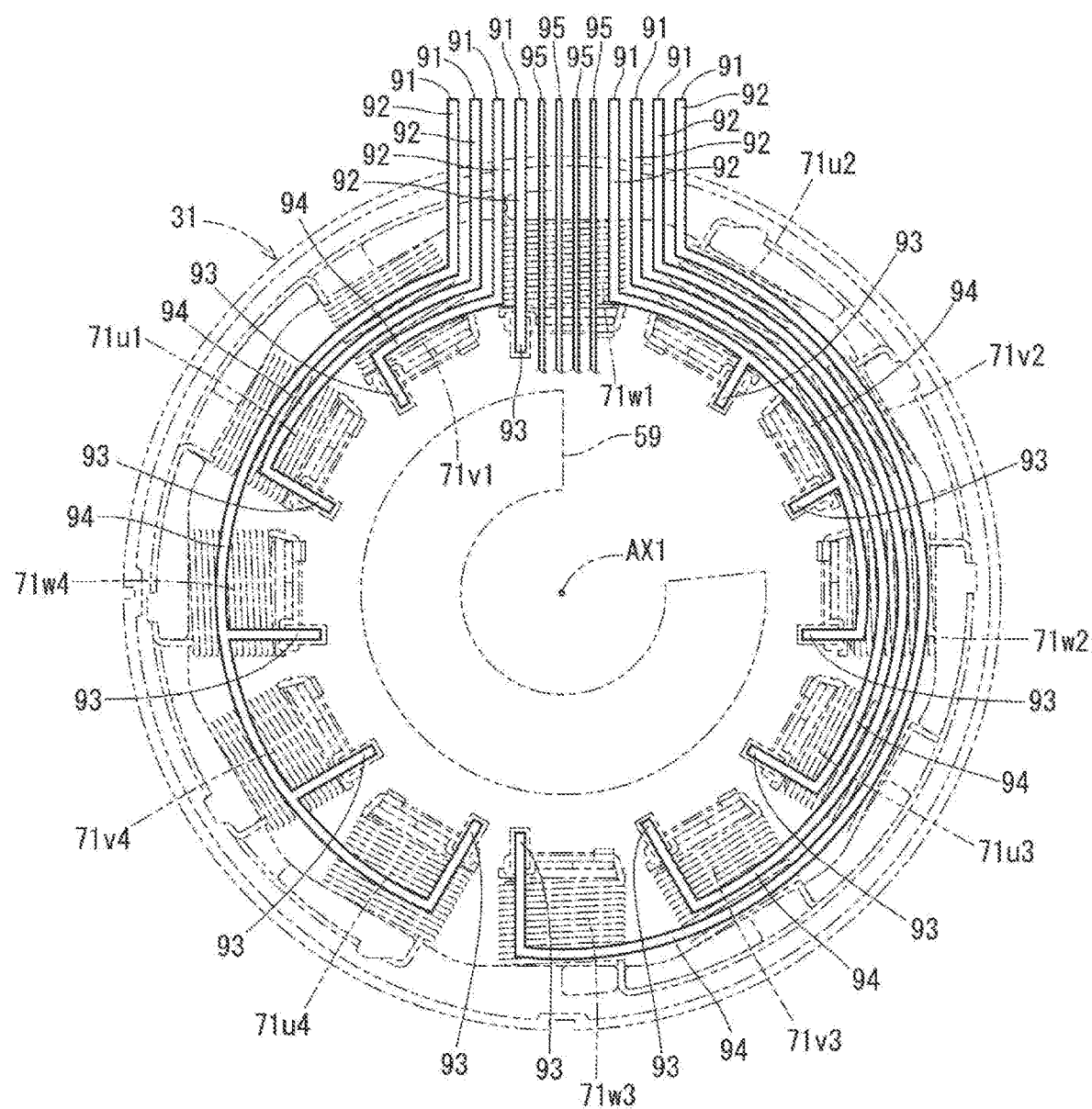
FIG. 14 is a view of the stator, motor terminal, and sensor terminal of a sixth embodiment as viewed from the axial direction.

In a sixth embodiment, as shown in FIG. 14, the connector portion 92 of a first system is arranged on one side of the sensor terminal 95, and the connector portion 92 of a second system is arranged on the other side of the sensor terminal 95. The extending directions of the connector portions 92 of the first system and the second system are the same. As a result, regardless of whether one connector portion 27 (see FIG. 2) of the front housing 21 is provided or two connector portions 27 are provided separately for each system, the connector portions 27 can be provided at one location in the circumferential direction so that the opening direction of the connector portion 27 is aligned. Therefore, the connection workability between the connector portion 27 and the external connector 17 is improved. In addition, parts other than the front housing 21 can be shared with a form that does not require redundancy.

Seventh Embodiment

Figure 15:
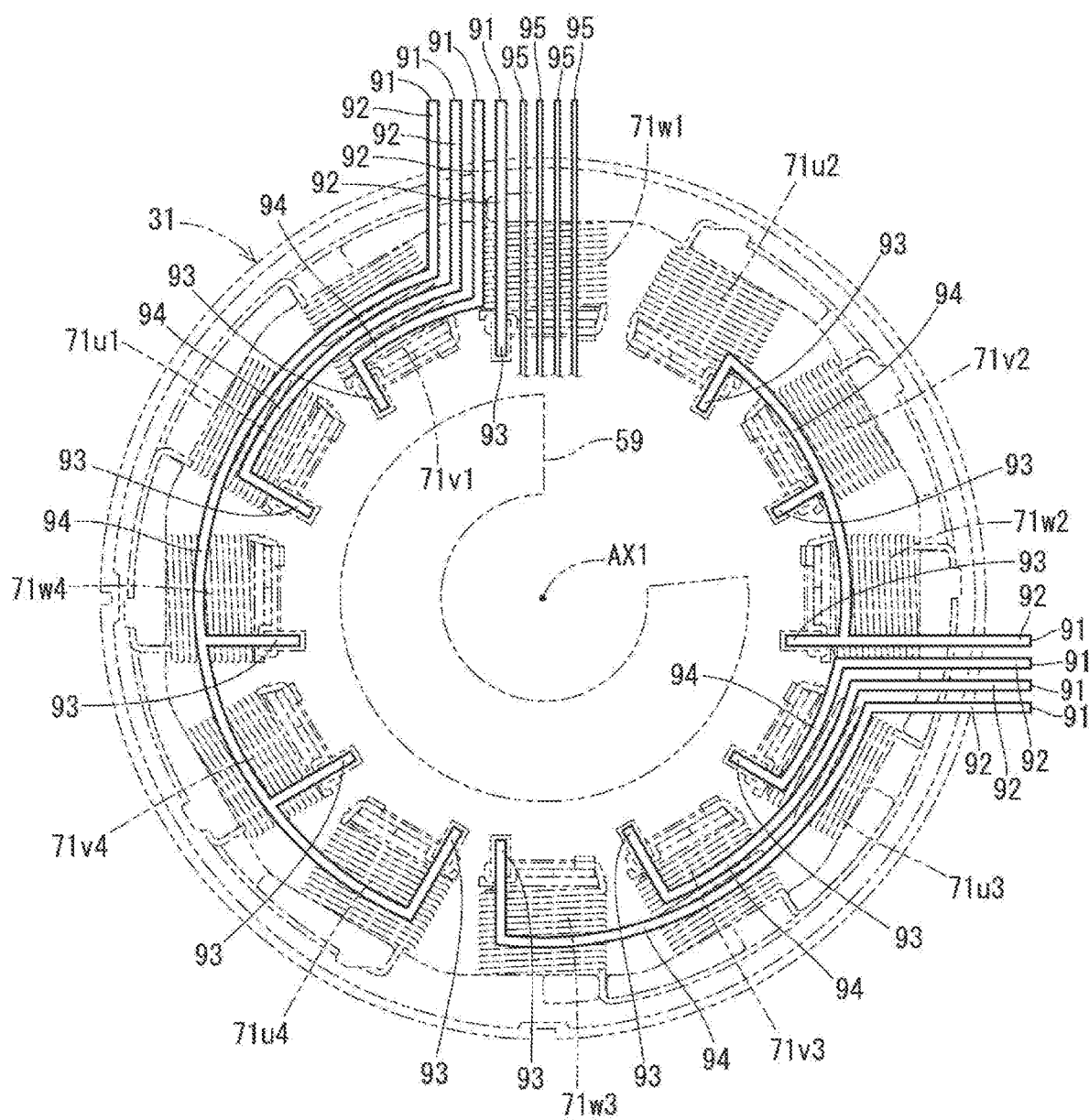
FIG. 15 is a view of the stator, motor terminal, and sensor terminal of a seventh embodiment as viewed from the axial direction.

In a seventh embodiment, as shown in FIG. 15, the connector portion 92 of the first system is arranged adjacent to the sensor terminal 95. The connector portion 92 of the second system is arranged at a portion separated from the connector portion 92 of the first system by 90° around the rotation axis AX1. As a result, it is possible to reduce the radial size of the motor 30 by suppressing radial overlap of the circumferentially extending parts of the motor terminals 91, and suppress deterioration in connection workability between the connector portion 27 and the external connector 17. In addition, parts other than the front housing 21 can be shared with a form that does not require redundancy.

Eighth Embodiment

Figure 16:
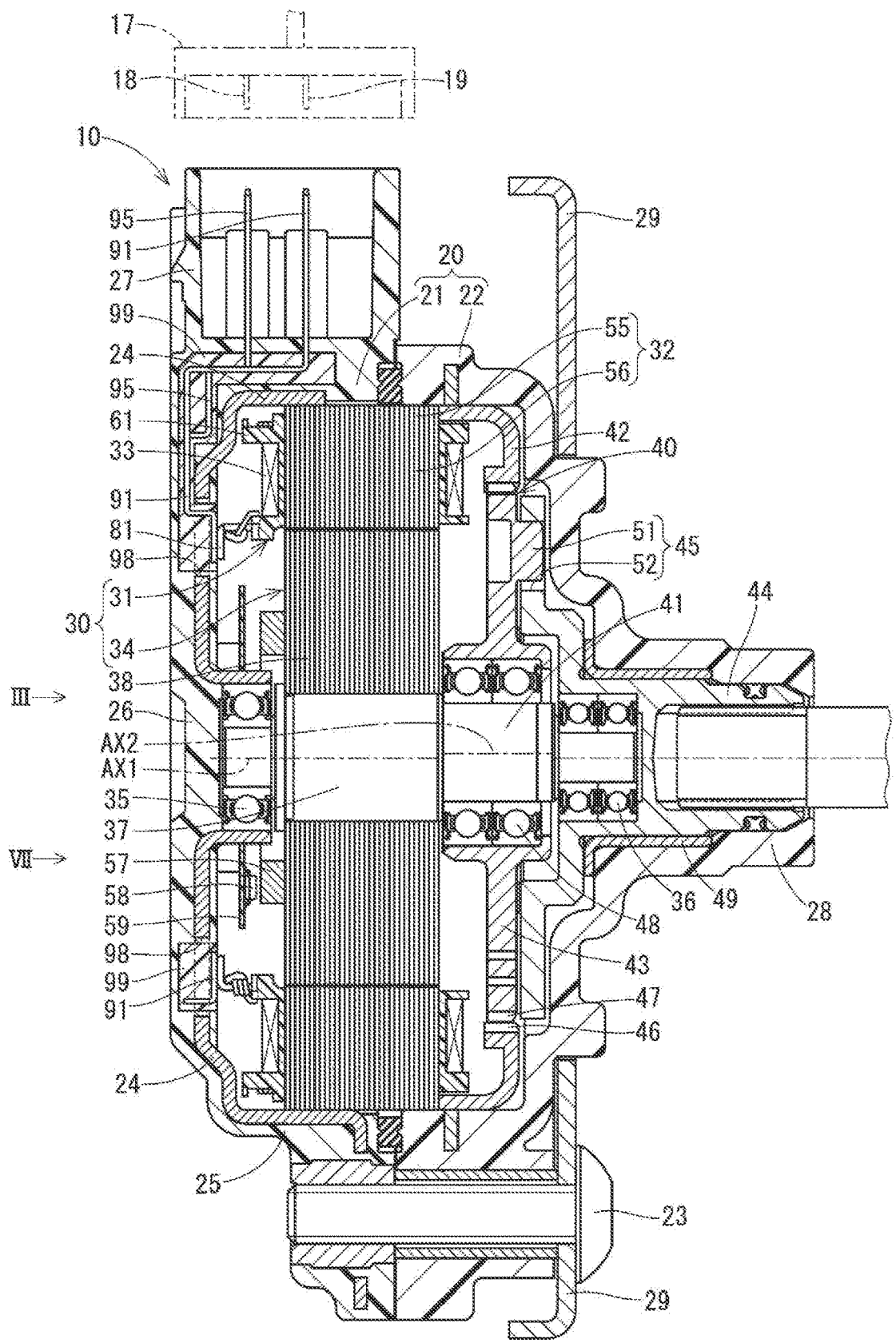
FIG. 16 is a cross-sectional view of the rotary actuator of an eighth embodiment.
Figure 17:
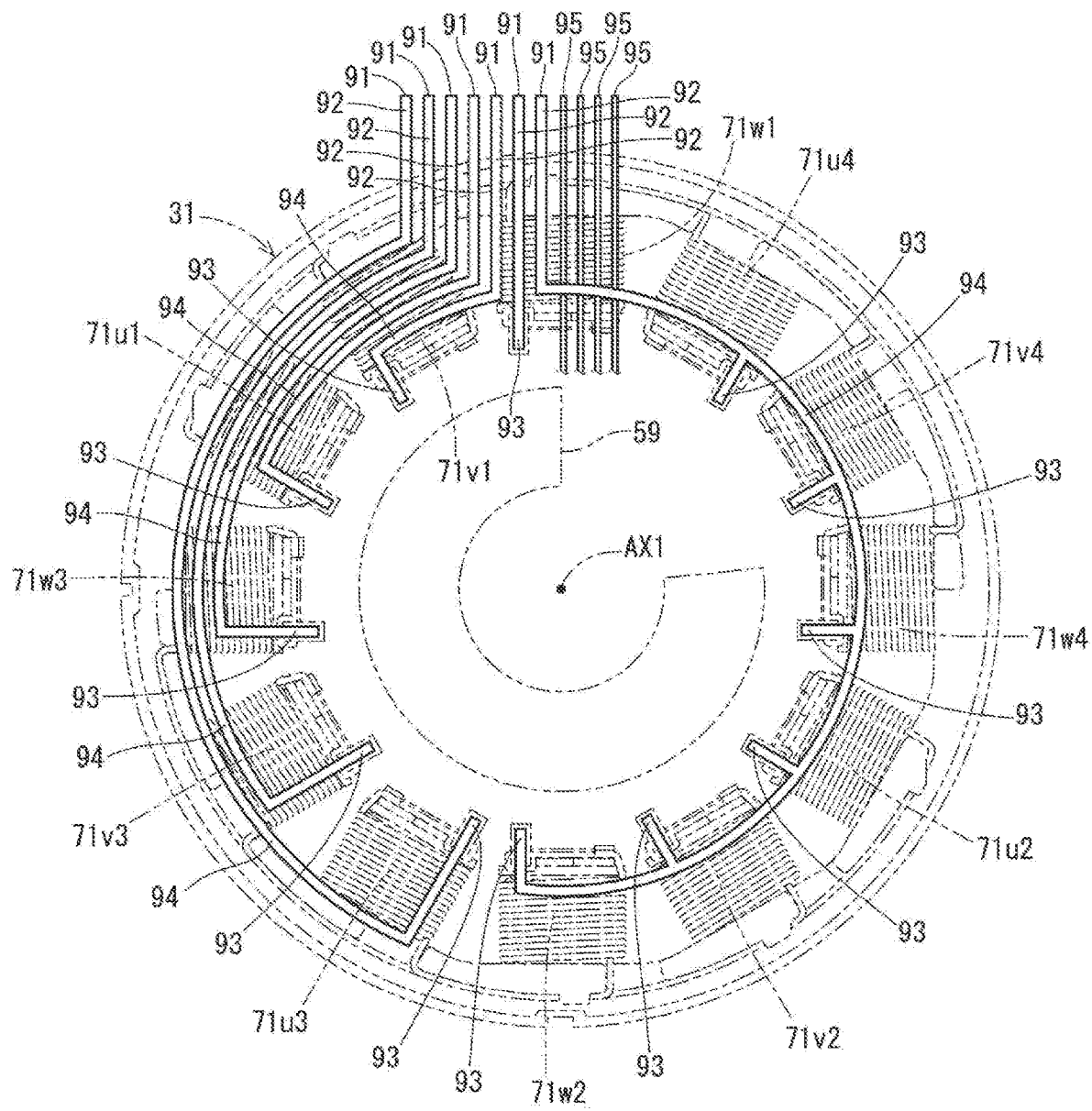
FIG. 17 is a view of the stator, motor terminal, and sensor terminal of FIG. 16 as viewed from the axial direction.

In an eighth embodiment, as shown in FIGS. 16 and 17, the circumferentially extending part of the connecting portion 94 of one motor terminal 91 is arranged so as to overlap a plurality of sensor terminals 95 in the axial direction in a region outside the coil terminal 81 in the radial direction. By overlapping the terminals in the dead space outside the coil terminals 81 in the radial direction in this way, a complicated electric circuit can be realized without increasing the axial size of the motor 30.

Ninth Embodiment

Figure 18:
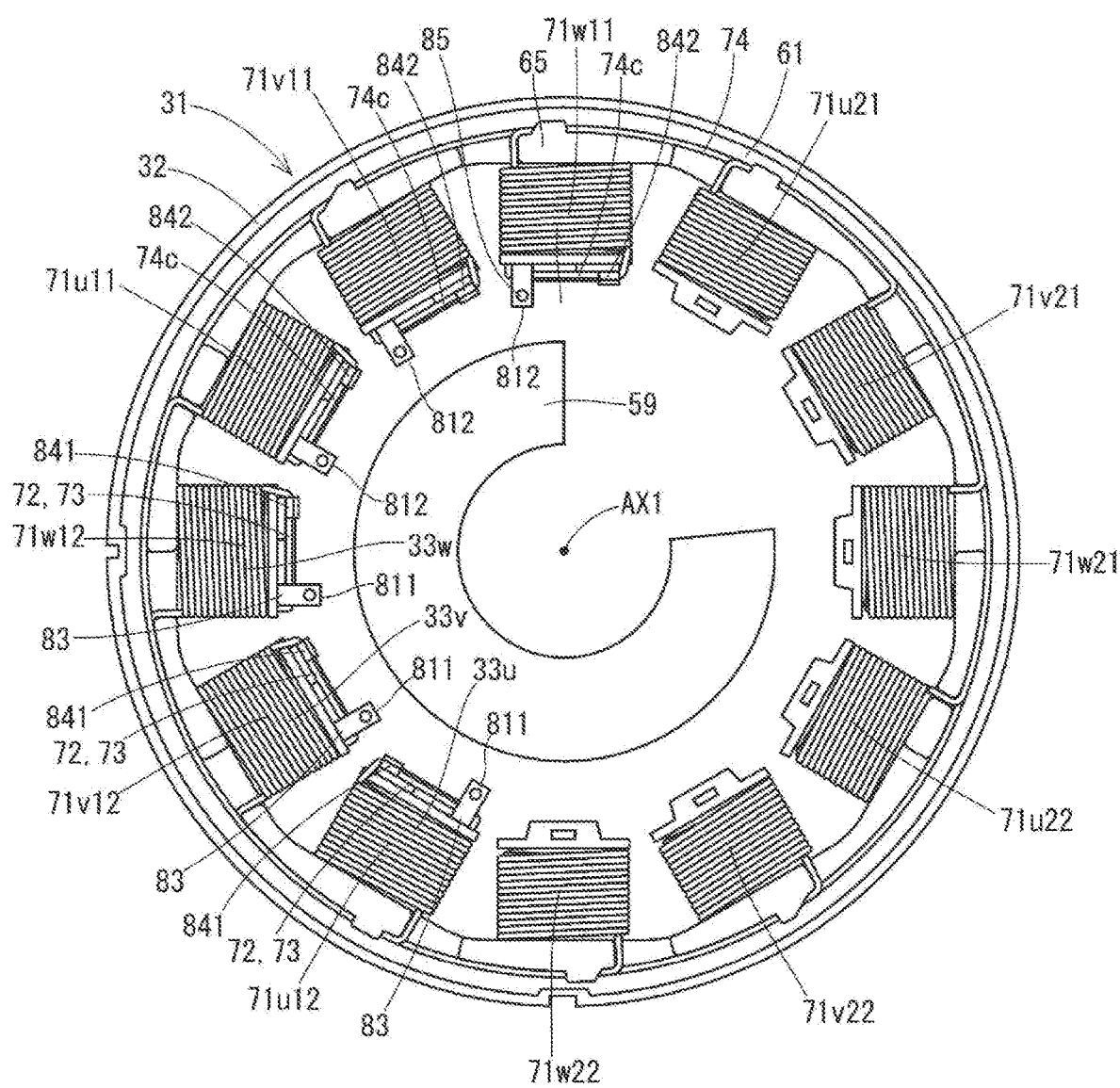
FIG. 18 is a view of the stator and a control board of a ninth embodiment as viewed from the axial direction.
Figure 19:
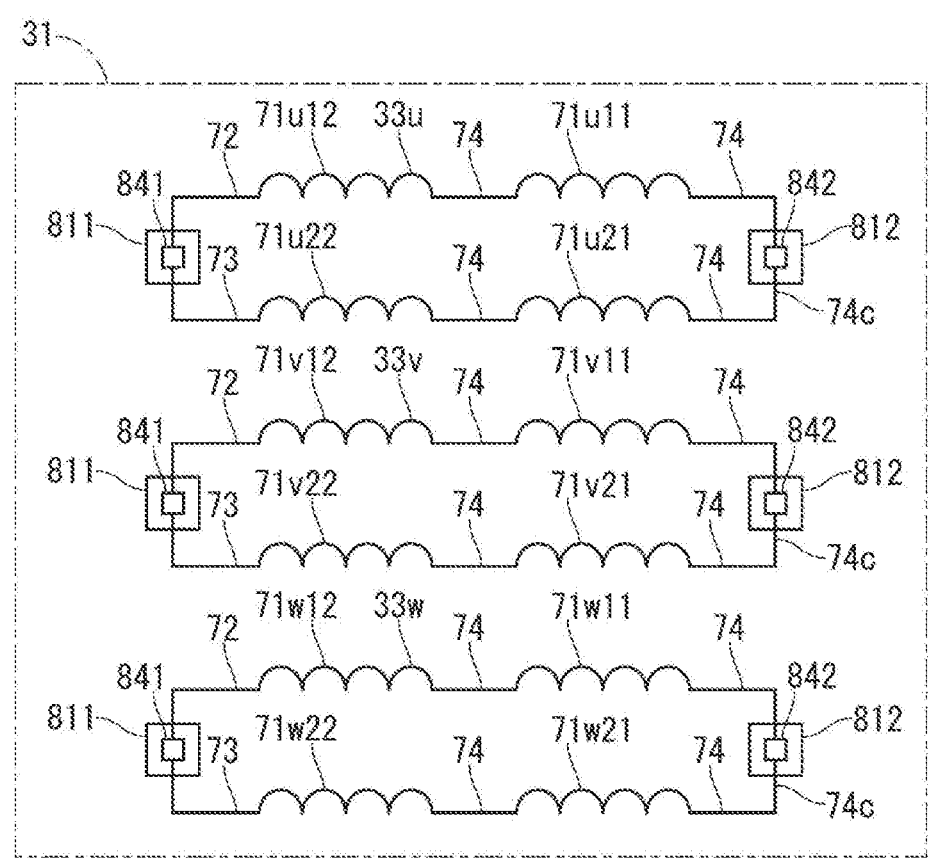
FIG. 19 is a diagram schematically showing windings and coil terminals of FIG. 18.

In a ninth embodiment, the winding 33 has four coils 71 between one end portion 72 and the other end portion 73, as shown in FIGS. 18 and 19. The U-phase winding 33*u* has coils 71*u*11, 71*u*12, 71*u*21 and 71*u*22, the V-phase winding 33*v* has coils 71*v*11, 71*v*12, 71*v*21 and 71*v*22, and the W-phase winding 33*w* has coils 71*w*11, 71*w*12, 71*w*21 and 71*w*22. In the U-phase winding 33*u*, coils 71*u*11 and 71*u*12 from one end portion 72 to an intermediate portion 74c and coils 71u21 and 71u22 from the intermediate portion 74c to the other end portion 73 are arranged in parallel. Similarly, in the V-phase winding 33v and the W-phase winding 33w, the first coil group and the second coil group are arranged in parallel.

The plurality of coil terminals include a first coil terminal 811 having a first winding connection portion 841 connected to one end portion 72 and the other end portion 73, and a second coil terminal 812 having a second winding connection portion 842 connected to the intermediate portion 74c between the two coils 71 included in one winding 33. The shapes of the first coil terminal 811 and the second coil terminal 812 are similar to the shape of the coil terminal 81 in the first embodiment. The first winding connection portion 841 of the first coil terminal 811 and the second winding connection portion 842 of the second coil terminal 812 are arranged inside the coil 71 in the radial direction. One end portion 72 and the other end portion 73 included in one winding 33 are connected to the same first winding connection portion 841.

The winding 33 is manufactured by nozzle winding. Specifically, the electric wire is entwined around the first winding holding portion 831 and passed through the first winding connection portion 841, and then wound around the first tooth insulating portion 63. Subsequently, after the electric wire pulled out from the first tooth insulating portion 63 is engaged with the locking portion 65, the electric wire is wound around the second tooth insulating portion 63. Subsequently, after the electric wire pulled out from the second tooth insulating portion 63 is passed through the second winding connection portion 842, and is engaged with the locking portion 65, the electric wire is then wound around the third tooth insulating portion 63. Subsequently, after the electric wire pulled out from the third tooth insulating portion 63 is engaged with the locking portion 65, the electric wire is wound around the fourth tooth insulating portion 63. Finally, after passing the electric wire pulled out from the fourth tooth insulating portion 63 through the first winding connection portion 841 that was passed at the beginning, the electric wire is entwined with the first winding holding portion 831 that was entwined at the beginning. The first winding connection portion 841 and the one end portion 72 and the other end portion 73 are connected by fusing or the like, for example. The second winding connection portion 842 and the intermediate portion 74c are similarly connected by, for example, fusing.

Figure 20:
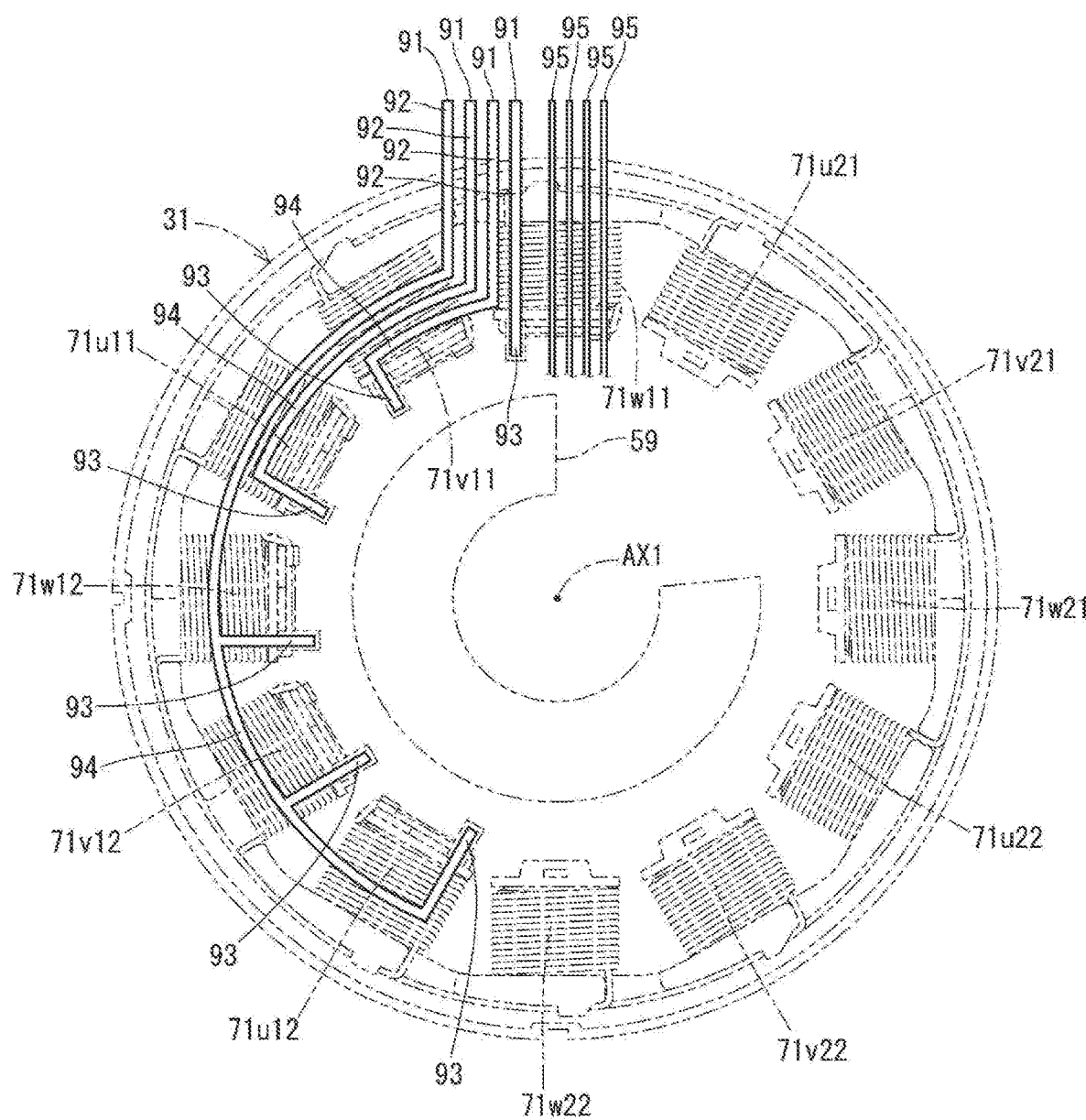
FIG. 20 is a view of the stator, motor terminal, and sensor terminal of FIG. 18 as viewed from the axial direction.

As shown in FIG. 20, regarding the motor terminal 91, two GND lines and one power line extend from the connector portion 92 to one side in the circumferential direction.
(Effects)

According to the stator 31 of the ninth embodiment, between the first coil terminal 811 and the second coil terminal 812, the coil 71 from the one end portion 72 to the intermediate portion 74c of the one winding 33 and the coil 71 from the intermediate portion 74c to the other end portion 73 are connected. are arranged in parallel. Therefore, as in the case of winding the windings in series, the nozzle winding is performed in which the windings 33 are continuously wound on two or more teeth 56 from the start to the end of the winding, and the winding 33 is passed through the second coil terminal 812 so as to construct a parallel circuit. Moreover, compared to the conventional form in which coil terminals are provided at both ends of two windings wound in series, the two coil terminals can be replaced with one second coil terminal 812, and the number of terminal processing of the winding 33 can be reduced. Therefore, the number of parts and the manufacturing man-hours can be reduced.

Further, in the ninth embodiment, the one end portion 72 and the other end portion 73 included in one winding 33 are connected to the same first winding connection portion 841. As a result, two coil terminals can be replaced with one first coil terminal 811 not only on the intermediate portion 74c side but also on the end portion side, and the number of terminal processes of the winding 33 can be reduced. Therefore, the number of parts and manufacturing man hours can be further reduced.

Further, in the ninth embodiment, the first winding connection portion 841 and the second winding connection portion 842 are arranged inward of the coil 71 in the radial direction. Therefore, as in the first embodiment, by using the winding connection portions 841 and 842 located in the inner peripheral portion of the stator 31, the nozzle winding for continuously winding the winding 33 on two or more teeth 56 from the winding start to the winding end can be implemented. Therefore, it is possible to prevent the coil terminals 811 and 812 from protruding outward in the radial direction while adopting a nozzle winding that can be manufactured at low cost. Therefore, an inexpensive and compact stator 31 can be obtained.

Further, in the ninth embodiment, at least a portion of the connecting portion 94 extends from the connector portion 92 to the contacted portion 93 through an opposite side to the stator core 32 with respect to the metal plate 24. For that reason, the same effects as those of the first embodiment can be obtained.

Tenth Embodiment

Figure 21:
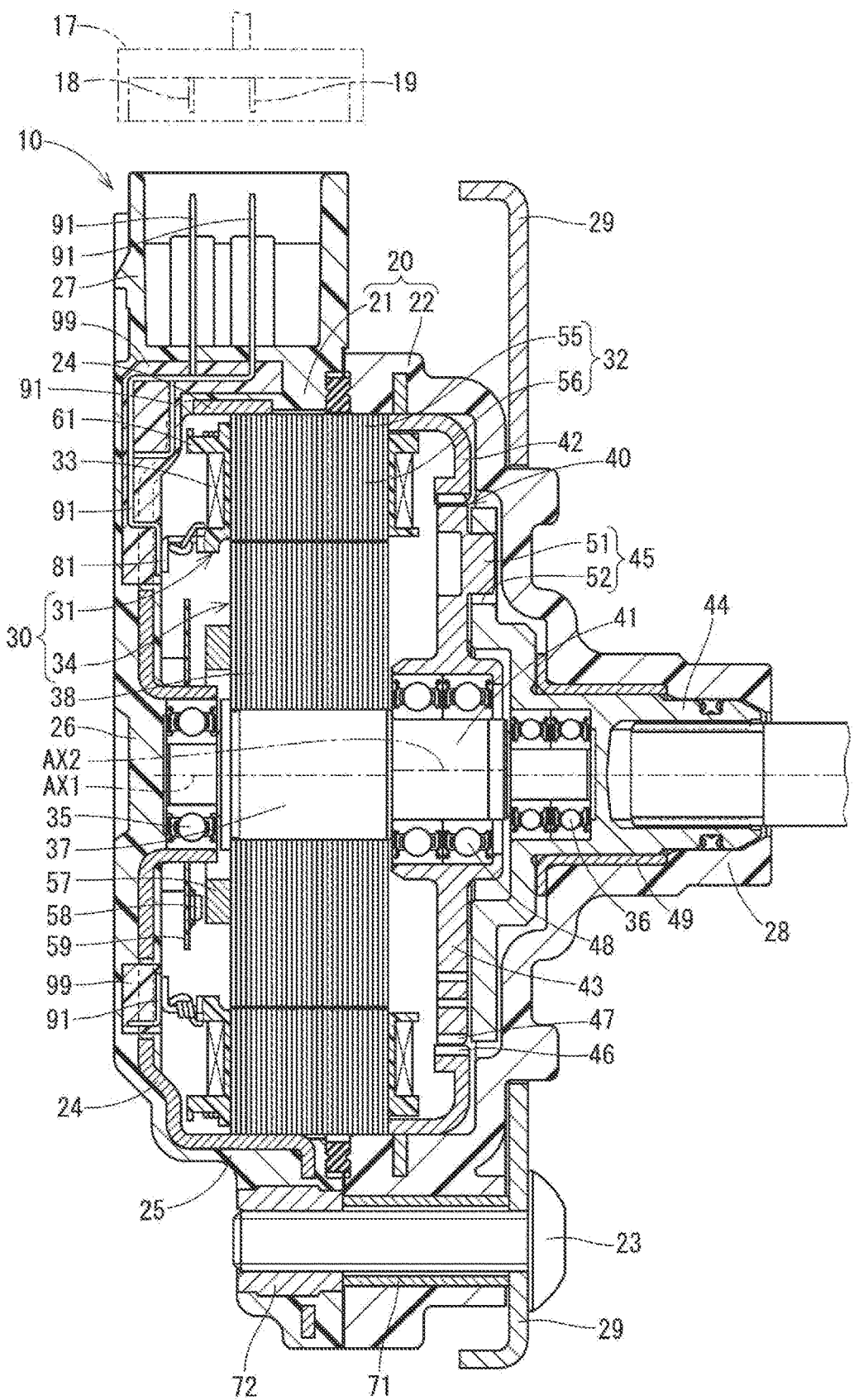
FIG. 21 is a cross-sectional view of the rotary actuator of a tenth embodiment.
Figure 22:
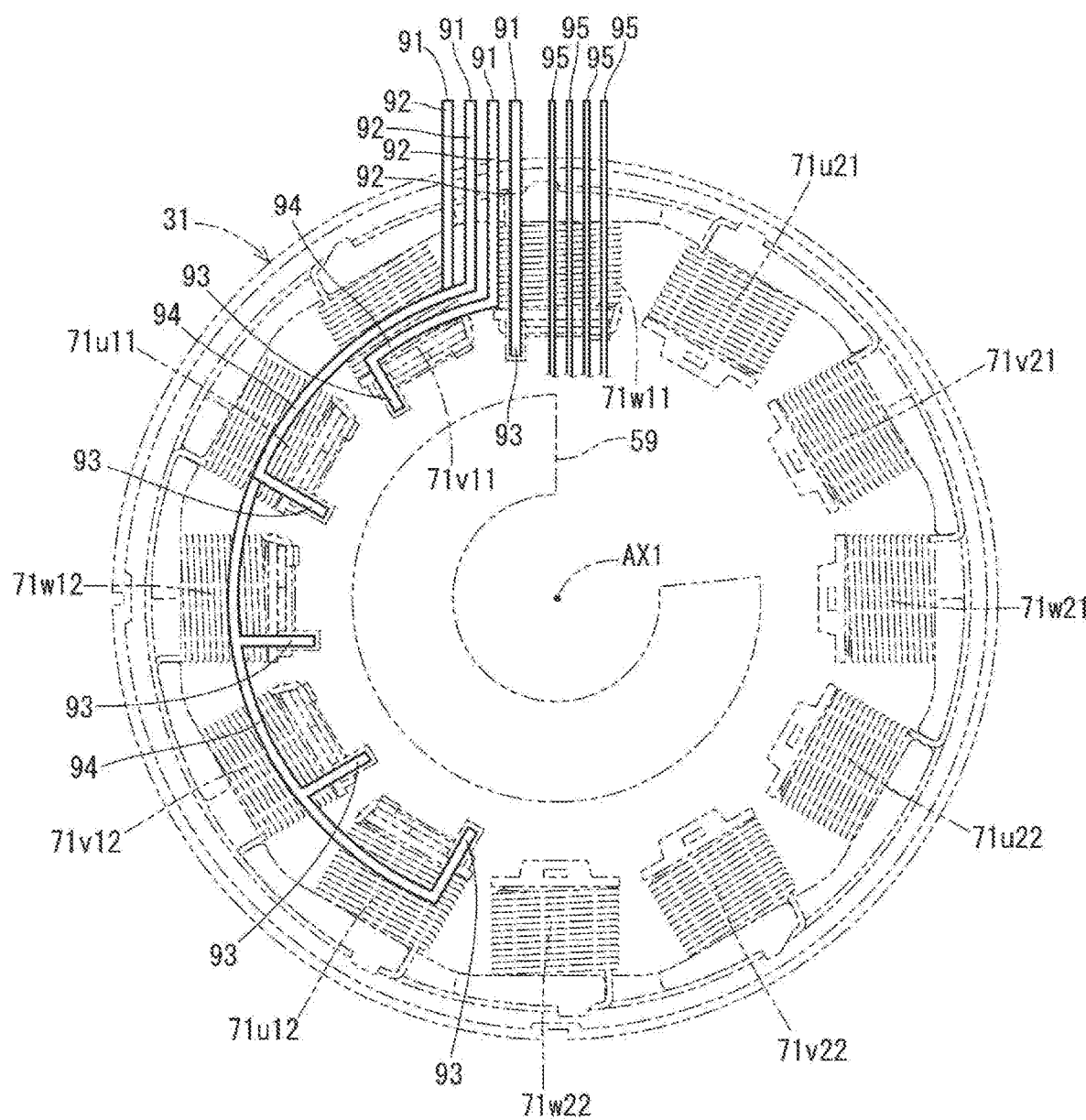
FIG. 22 is a view of the stator, motor terminal, and sensor terminal of FIG. 21 as viewed from the axial direction.

In a tenth embodiment, as shown in FIGS. 21 and 22, the circumferentially extending part of the connecting portion 94 of one motor terminal 91 is arranged so as to overlap the circumferentially extending part of the connecting portion 94 of one other motor terminal 91 in the axial direction in a region outside the coil terminal 81 in the radial direction. By overlapping the terminals in the dead space outside the coil terminals 81 in the radial direction in this way, a complicated electric circuit can be realized without increasing the axial size of the motor 30.

Eleventh Embodiment

Figure 23:
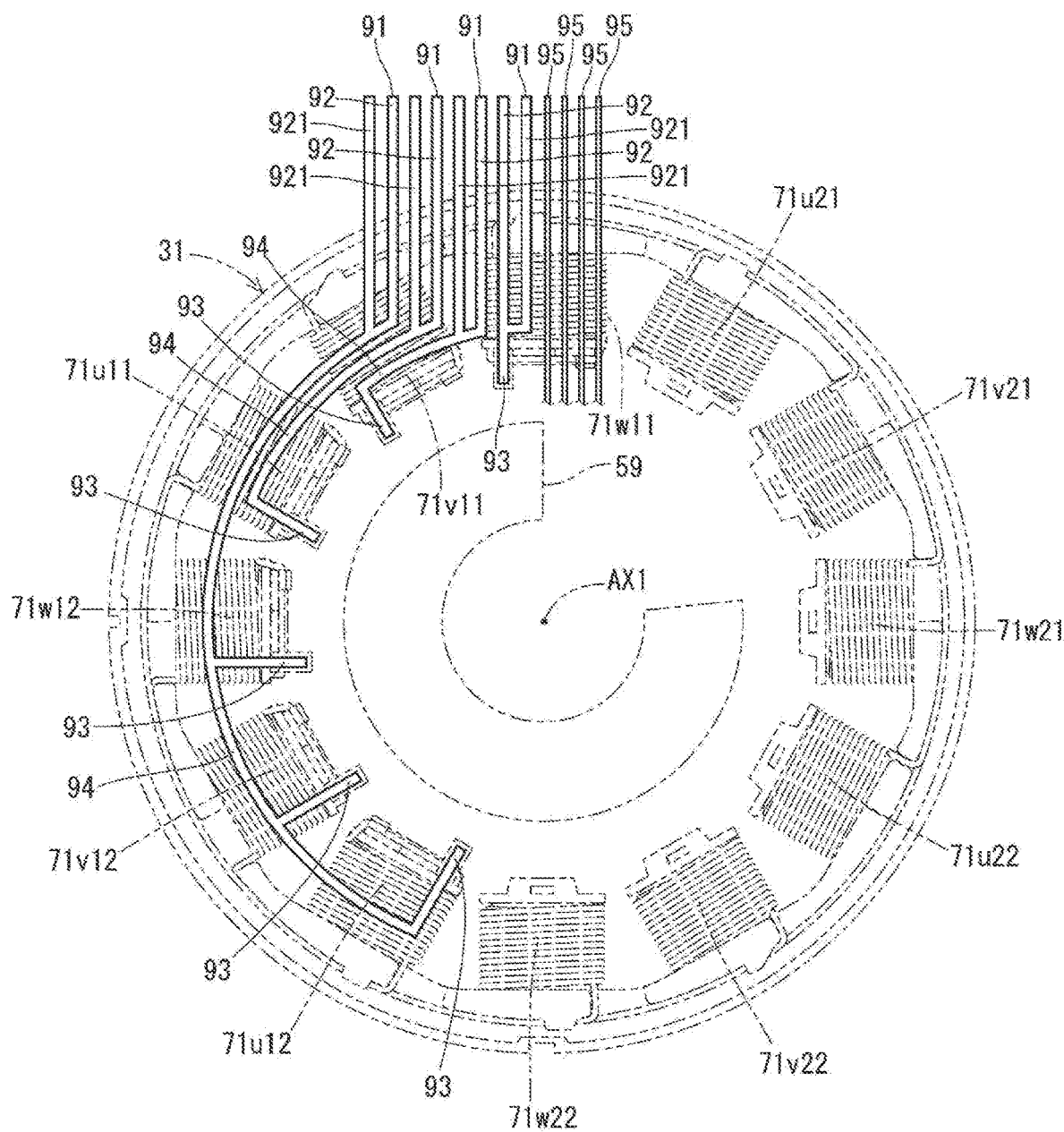
FIG. 23 is a view of the stator, motor terminal, and sensor terminal of an eleventh embodiment as viewed from the axial direction.

In an eleventh embodiment, as shown in FIG. 23, the motor terminal 91 is made redundant between the contacted portion 93 and the external power supply terminal 18 (see FIG. 2). Specifically, the motor terminal 91 has a connector portion 921 separate from the connector portion 92 and connected to the connecting portion 94. Thus, by duplicating only the motor terminal 91 without duplicating the winding 33, the motor 30 can be driven by the redundant electric circuit in the event of an electrical system failure between the battery and the motor terminal 91. In addition, parts other than the front housing 21 can be shared with a form that does not require redundancy.

In FIG. 23, although both the power line and the GND line of the motor terminal 91 are duplicated, either the power line or the GND line may be duplicated in other embodiments.

In FIG. 23, the connector portion 921 is arranged so as not to overlap other portions of the motor terminal 91 in the axial direction, but in other embodiments, the connector portion 921 may overlap other portions of the motor terminal 91 in the axial direction.

OTHER EMBODIMENTS

In other embodiments, the winding holding portion is not limited to being part of the coil terminal, but may be part of, for example, an insulator or other member. Moreover, the extending direction of the winding holding portion is not limited to the axial direction, and may be the radial direction, the circumferential direction, or any other direction.

In other embodiments, the joining of the coil terminal and the motor terminal is not limited to welding, and may be performed by other methods such as pressure welding or soldering. In other embodiments, the connector portion of the front housing may be split into two or more.

In other embodiments, the number of teeth is not limited to 12 and may be other numbers. In other embodiments, the number of winding phases is not limited to three, and may be any other number. In other embodiments, the stator may be applied not only to motor but also to generator.

The present disclosure is not limited to the embodiments described above, and various modifications are possible within the scope of the present disclosure without departing from the spirit of the invention.

The present disclosure has been made in accordance with the embodiments. However, the present disclosure is not limited to such embodiments and configurations. This disclosure also encompasses various modifications and variations within the scope of equivalents. Furthermore, various combination and formation, and other combination and formation including one, more than one or less than one element may be made in the present disclosure.

What is claimed is:

1. A rotating electrical machine of inner rotor type, comprising:
   a cup-shaped housing made of resin;
   a metal plate formed in a cylindrical shape with a bottom so as to follow the shape of the housing and inserted into the housing;
   a stator core having an annular yoke fixed inside a tubular portion of the metal plate, and a plurality of teeth protruding inward from the yoke;
   a plurality of windings having coils wound around the teeth;
   a plurality of winding holding portions that hold one end portion or the other end portion of the windings, or both the one end portion and the other end portion;
   a plurality of coil terminals having a winding connection portion connected to the winding; and
   a plurality of motor terminals inserted into the housing and connected to the coil terminal;
   wherein
   the winding is one electric wire provided over two or more of the teeth, and has two or more of the coils between the one end portion and the other end portion,
   a direction perpendicular to a rotation axis of the rotating electrical machine is defined as a radial direction, a direction parallel to the rotation axis is defined as an axial direction, and a direction around the rotation axis is defined as a circumferential direction,
   the winding holding portion and the winding connection portion are arranged in a range in the axial direction between a bottom portion of the metal plate and the stator core and inward of the coil in the radial direction,
   a motor terminal of the plurality of motor terminals includes: a connector portion, a contacted portion, and a connecting portion; wherein: the connector portion of the motor terminal is connectable to the external power supply terminal; and, the contacted portion of the motor terminal is contacted by the contact portion of the coil terminal in the axial direction; and the connecting portion of the motor terminal connects the connector portion and the contacted portion,
   the motor terminal of the plurality of motor terminals that, having the connector portion and the contacted portion located at different positions in the circumferential direction, is herein defined as a specific motor terminal, and
   a connecting portion of the specific motor terminal extends in the circumferential direction on a side opposite to the stator core with respect to the bottom portion and extends in the axial direction to the contacted portion through a through hole in the bottom portion.

2. The rotating electrical machine according to claim 1, wherein
   the motor terminals are arranged in a region radially inward of the yoke so as not to overlap with each other in the axial direction.

3. The rotating electrical machine according to claim 1, further comprising,
   a control board mounted with an element for detecting a rotational position of the rotating electrical machine and arranged inward of the stator core in the radial direction; and
   a plurality of sensor terminals connected to the control board and connectable to an external signal terminal, wherein
   the plurality of motor terminals and the sensor terminals are arranged in a radially inner region of the yoke so as not to overlap with each other in the axial direction.

4. The rotating electrical machine according to claim 3, wherein
   an interval between the two contact portions adjacent in the circumferential direction is defined as a contact portion pitch,
   an interval between the two teeth adjacent in the circumferential direction is defined as a tooth pitch, and
   the sensor terminal passes between two specific contact portions that are provided such that the contact portion pitch is larger than the tooth pitch among the plurality of contact portions when viewed in the axial direction.

5. The rotating electrical machine according to claim 1, further comprising,
   a control board mounted with an element for detecting a rotational position of the rotating electrical machine and arranged inward of the stator core in the radial direction; and
   a plurality of sensor terminals connected to the control board and connectable to an external signal terminal, wherein
   at least two of the plurality of motor terminals and the plurality of sensor terminals are arranged so as to overlap each other in the axial direction in a region outside of said coil terminals in the radial direction.

6. The rotating electrical machine according to claim 1, wherein
   the motor terminal is redundant from the contacted portion to the external power supply terminal.

* * * * *